US011258697B2

(12) United States Patent
Ross et al.

(10) Patent No.: US 11,258,697 B2
(45) Date of Patent: Feb. 22, 2022

(54) SYSTEMS AND METHODS FOR BUILDING WIRELESS MESH NETWORKS

(71) Applicant: L3VEL, LLC, Wilmington, DE (US)

(72) Inventors: Kevin Ross, Lehi, UT (US); Muhammad Ahsan Naim, South Jordan, UT (US)

(73) Assignee: L3VEL, LLC, Wilmington, DE (US)

( * ) Notice: Subject to any disclaimer, the term of this patent is extended or adjusted under 35 U.S.C. 154(b) by 0 days.

(21) Appl. No.: 17/355,445

(22) Filed: Jun. 23, 2021

(65) Prior Publication Data

US 2021/0320860 A1 Oct. 14, 2021

Related U.S. Application Data

(63) Continuation of application No. 17/201,857, filed on Mar. 15, 2021, which is a continuation of application
(Continued)

(51) Int. Cl.
*H04W 16/18* (2009.01)
*H04W 16/24* (2009.01)
(Continued)

(52) U.S. Cl.
CPC ..... *H04L 45/122* (2013.01); *H04B 10/25753* (2013.01); *H04L 41/0816* (2013.01);
(Continued)

(58) Field of Classification Search
CPC .............................. H04W 16/18; H04W 16/24
See application file for complete search history.

(56) References Cited

U.S. PATENT DOCUMENTS 8,385,921 B1  2/2013  Shousterman et al.
8,406,126 B1  3/2013  Leiba et al.
(Continued)

FOREIGN PATENT DOCUMENTS

CN    102868452 A1   9/2013
WO    2018083548 A1   5/2018

OTHER PUBLICATIONS

Sakaguchi et al., "Where, When, and How mmWave is Used in 5G and Beyond", IEICE Trans. Electron./vol. E100-C, No. 10, Oct. 2017 (Year: 2017).*

(Continued)

*Primary Examiner* — Shi K Li
(74) *Attorney, Agent, or Firm* — Lee Sullivan Shea & Smith LLP

(57) ABSTRACT

Disclosed herein is a system comprising a set of wireless communication nodes that are configured to operate as part of a wireless mesh network. Each respective wireless communication node may be directly coupled to at least one other wireless communication node via a respective short-hop wireless link, and at least a first pair of wireless nodes may be both (a) indirectly coupled to one another via a first communication path that comprises one or more intermediary wireless communication nodes and two or more short-hop wireless links and (b) directly coupled to one another via a first long-hop wireless link that provides a second communication path between the first pair of wireless communication nodes having a lesser number of hops than the first communication path. A fiber access point may be directly coupled to a first wireless communication node of the set of wireless communication nodes.

20 Claims, 19 Drawing Sheets

Related U.S. Application Data

No. 16/563,564, filed on Sep. 6, 2019, now Pat. No. 10,951,513.

(60) Provisional application No. 62/787,631, filed on Jan. 2, 2019, provisional application No. 62/780,715, filed on Dec. 17, 2018, provisional application No. 62/778,193, filed on Dec. 11, 2018, provisional application No. 62/770,456, filed on Nov. 21, 2018, provisional application No. 62/727,753, filed on Sep. 6, 2018.

(51) Int. Cl.

| | |
|---|---|
| *H04L 45/122* | (2022.01) |
| *H04W 40/02* | (2009.01) |
| *H04B 10/2575* | (2013.01) |
| *H04L 45/16* | (2022.01) |
| *H04L 41/12* | (2022.01) |
| *H04Q 11/00* | (2006.01) |
| *H04L 41/0816* | (2022.01) |
| *H04W 84/18* | (2009.01) |

(52) U.S. Cl.
CPC .............. *H04L 41/12* (2013.01); *H04L 45/16* (2013.01); *H04Q 11/0067* (2013.01); *H04W 40/02* (2013.01); *H04Q 2011/0081* (2013.01); *H04W 84/18* (2013.01)

(56) References Cited

U.S. PATENT DOCUMENTS

| | | | |
|---|---|---|---|
| 9,425,985 | B1 | 8/2016 | Shousterman et al. |
| 9,538,331 | B2 | 1/2017 | Ross et al. |
| 9,621,465 | B2 | 4/2017 | Ross |
| 9,860,179 | B2 | 1/2018 | Ross |
| 9,942,776 | B2 | 4/2018 | Ross et al. |
| 9,973,939 | B2 | 5/2018 | Ross |
| 10,027,508 | B2 | 7/2018 | Leiba et al. |
| D856,962 | S | 8/2019 | Hart et al. |
| 10,530,851 | B1 | 1/2020 | Hart |
| 10,530,882 | B2 | 1/2020 | Ross |
| 2008/0291846 | A1 | 11/2008 | Lu |
| 2008/0310350 | A1 | 12/2008 | Dykema et al. |
| 2009/0147767 | A1 | 11/2009 | Lee |
| 2010/0111088 | A1 | 6/2010 | Olofsson |
| 2011/0021231 | A1* | 1/2011 | Burns .................. H04B 17/309 455/509 |
| 2013/0094439 | A1 | 4/2013 | Moshfeghi |
| 2013/0177321 | A1 | 6/2013 | DeVaul et al. |
| 2014/0014770 | A1 | 1/2014 | Teller et al. |
| 2014/0057570 | A1 | 2/2014 | Leiba |
| 2015/0071248 | A1 | 3/2015 | Faerber et al. |
| 2015/0280810 | A1 | 10/2015 | Beals et al. |
| 2015/0358082 | A1 | 12/2015 | Ross |
| 2017/0025751 | A1 | 1/2017 | White et al. |
| 2018/0331935 | A1 | 11/2018 | Ross et al. |
| 2018/0343685 | A1 | 11/2018 | Hart et al. |
| 2019/0081767 | A1 | 3/2019 | Luo et al. |

OTHER PUBLICATIONS

International Searching Authority International Search Report and Written Opinion dated Dec. 26, 2019, issued in connection with International Application No. PCT/US2019/050051, filed Sep. 6, 2019, 10 pages.

"Millimeter Wave Propagation: Spectrum Management Implications", Federal Communications Commission Office of Engineering and Technology, New Technology Development Division, FCC Bulletin No. 70, Jul. 1997, 26 pages.

* cited by examiner

SYSTEMS AND METHODS FOR BUILDING WIRELESS MESH NETWORKS

CROSS-REFERENCE TO RELATED APPLICATIONS

This application claims priority to: (i) U.S. patent application Ser. No. 17/201,857, filed Mar. 15, 2021 and entitled "Systems and Methods for Building Wireless Mesh Networks," (ii) U.S. patent application Ser. No. 16/563,564, filed Sep. 6, 2019, and entitled "Systems and Methods for Building Wireless Mesh Networks," (iii) U.S. Provisional App. No. 62/787,631, filed Jan. 2, 2019, and entitled "Methods for Building Wireless Mesh Network for a Service Provider," (iv) U.S. Provisional App. No. 62/780,715, filed Dec. 17, 2018, and entitled "Methods for Building Wireless Mesh Network with Wired Links," (v) U.S. Provisional App. No. 62/778,193, filed Dec. 11, 2018, and entitled "Methods for Building Wireless Mesh Network," (vi) U.S. Provisional App. No. 62/770,456, filed Nov. 21, 2018, and entitled "Methods for Building Wireless Mesh Network," and (vii) U.S. Provisional App. No. 62/727,753, filed Sep. 6, 2018, and entitled "Methods for Designing Wireless Mesh Network," each of which is incorporated herein by reference in its entirety.

BACKGROUND

Wired and wireless networking and communications systems are widely deployed to provide various types of communication and functional features, including but not limited to those for interne data services, security and automation, and/or others. These systems may be capable of supporting communication with a user through a communication connection or a system management action.

Current wireless mesh network design approaches face many challenges. For instance, due to relatively short length of a wireless link mainly due to use of millimeter wave (mmWave) spectrum, a large number of hops of point-to-point (ptp) or point-to-multipoint (ptmp) links are required to connect end customers to the core network or data center. This results in requirement of a large number of wireless mesh network nodes to cover a medium to large size coverage area. Each wireless mesh network node hosting a single or multiple ptp/ptmp mmWave communication equipment requires uninterrupted supply of power for operations. Almost every wireless mesh network node not only carries data of its own end user (e.g., customer at the node location) but also carries data of other wireless mesh network nodes. Hence interruption in power supply to one wireless mesh network node can impact multiple wireless mesh network nodes.

In particular, next generation wireless networks, such as 5G wireless networks, differ from most of the previous generation wireless networks mainly due to the introduction of millimeter wave spectrum for transmission of information carrying electromagnetic signals for high capacity communication links. These signals at millimeter wave frequency experience high free space propagation loss, high building and vegetation penetration loss. Current 5G wireless mesh network design approaches face many of the same challenges noted above. For instance, due to relatively short length of a wireless link mainly due to use of millimeter wave spectrum, a large number of hops of point-to-point or point-to-multipoint links are required to connect end customer to the core network. Hence a large number of anchor sites are required to host the mmWave and other wireless frequency equipment required to establish those point-to-point, point-to-multipoint and cellular links of the network.

Accordingly, there exists multiple needs in the art for improved systems and methods relating to wireless communication mesh network design.

OVERVIEW

The present disclosure, for example, relates to wireless networks and communications including, but not limited to, broadband interne services to end user, security and/or automation systems, as well as wireless mesh networking and related operations and techniques.

In one aspect, disclosed herein are systems and methods that relate to wireless (e.g., narrow beam) mesh networks, associated systems, and operations relating to network communication, including, in some embodiments, adjustments and modifications. The disclosed systems and methods may facilitate designing, operating and/or adjusting/modifying wireless networking communications. In some embodiments, the disclosed systems and methods relate to and account for wireless communication nodes that are capable of establishing point-to-point extremely narrow beam communication link, point-to-point steerable extremely narrow beam communication link, point-to-point multiple extremely narrow beam communication link, point-to-multipoint narrow beam communication links, ultra-wide-band point-to-point communication link and a combination of point-to-point and point-to-multipoint communication links, among other possibilities.

In another aspect, disclosed herein are systems and methods that relate to the design of millimeter wave mesh networks, associated systems, and operations relating to network communication, including, in some embodiments, adjustments and modifications. In some embodiments, the disclosed systems and methods relate to and account for designing and constructing a wireless mesh network with one or more of (1) long hop links, (2) short hop links, or (3) high capacity long hop links.

In accordance with the present disclosure, a long hop link may take various forms. In some embodiments, a long hop link can be a point-to-point millimeter wave-based link between two locations that have a line-of-sight path for the millimeter waves to propagate. In different embodiments, a long hop link can be a point-to-multipoint millimeter wave-based link between locations that have a line-of-sight path for the millimeter wave to propagate.

Similarly, a short hop link may take various forms. In one embodiment, a short hop link can be a point-to-point millimeter wave-based link between two locations that have a line-of-sight path for the millimeter waves to propagate. In another embodiment, a short hop link can be point-to-multipoint millimeter wave-based link between locations that have a line-of-sight path for the millimeter waves to propagate.

Likewise, a high capacity long hop link may take various forms. In some embodiments, a high capacity long hop link can be a point-to-point millimeter wave-based link between two locations that have a line-of-sight path for the millimeter waves to propagate. In different embodiments, a high capacity long hop link can be a point-to-multipoint millimeter wave-based link between locations that have a line-of-sight path for the millimeter wave to propagate.

In other embodiments, there can also be partial line-of-sight or non-line-of-sight path for long hop links, short hop links, and high capacity long hop links. In some embodiments, a long hop link's length can be larger than short hop link's length. For example, a long hop link can be 600 meters or greater in length whereas a short hop link can be 300 meters or less in length. In other embodiments, long hop links and short hop links can take a different value that can be greater or less than 600 meters and 300 meters, respectively. In some embodiments, high capacity long hop links can be 1000 meters or greater in length.

In some embodiments, long hop links provide redundant paths for data traffic flow between an end-user and the core network that improves a mesh network's reliability and adds resilience to the mesh network against link failures due to change in the line-of-sight path, hardware/equipment failures, etc. In another embodiment, long hop links in a wireless mesh network reduce the latency or packet delay by reducing the total number of hops required to send data packets from an end-user to the core network or vice versa. In some embodiments, high capacity long hop links provide redundant paths for data traffic flow between an end-user and the core network that improves a mesh network's reliability and adds resilience to the mesh network against link failures due to change in the line-of-sight path, hardware/equipment failures, and the like, as well as increasing the overall capacity of the mesh network. In another embodiment, high capacity long hop links in a wireless mesh network reduces the latency or packet delay by reducing the total number of hops required to send data packets from an end-user to the core network or vice versa.

In another embodiment, long hop links and short hops links can be used to create a mesh network or a segment of a mesh network that originates from one fiber PoP (Point of Presence) to a different fiber PoP. Yet in another embodiment, multiple long hop links can originate from a single fiber PoP in multiple directions in the shape of wheel spokes. These long hop links can further be connected directly and/or indirectly with other short hop link to provide access to multiple end users.

In another embodiment, a wireless mesh network comprising of long hop links and short hop links can be designed with a constraint that adjacent short hop links that are directly connected to each other do not form a straight-line in order to avoid interference from each other and end-user locations. For example, adjacent short hop links may be chosen such that they form a zig-zag pattern or a pattern other than a straight line that ensures that millimeter wave signal propagation from one short hop link does not cause interference to the millimeter wave signals of adjacent short hop link.

In accordance with the present disclosure, an example approach to building a wireless mesh network comprising short hops links, long hop links and high capacity long hop links can be designed and built in phases. For example, in one embodiment, a wireless communication mesh network can be built in two phases. In the first phase, the wireless mesh network may consist of only high capacity long hop links that provide a mesh network the ability to quickly access and cover a wide area with limited number of links. In the second phase, a large number of long and short hop links can be added to the wireless mesh network that either directly or in-directly connect to high capacity log hop links, thereby providing wireless access to a large number of end users. In another embodiment, a wireless mesh network can be built in a way that short hop links, long hop links and high capacity long hop links are deployed in parallel.

In some embodiments, a wireless mesh network may be designed and constructed with one or more of (1) seed nodes, (2) type A nodes, (3) adjacent type B nodes, or (4) non-adjacent type B nodes.

In accordance with the present disclosure, a seed node may be a type of wireless mesh communication network node that hosts mmWave equipment to establish very high capacity ptp/ptmp links with a fiber PoP node and mmWave equipment to establish high capacity ptp/ptmp links with other nodes in a wireless mesh network. In some embodiments, type A node may be a type of node in a wireless mesh communication network that hosts mmWave equipment to establish high capacity ptp/ptmp links with other type A nodes or a seed node in the wireless mesh communication network. In some embodiments, an adjacent type B node may be a type of network node that is adjacent to a seed or type A node and can be linked to an adjacent seed or type A node via a wired medium. These adjacent type B nodes can provide alternate power supply options for seed or type A nodes especially during a power outage event longer than the run time of the backup power supply at the seed or type A nodes. These adjacent type B nodes can get high speed internet data connection via wired medium through their respective adjacent seed or type A nodes without the need of deployment of any mmWave equipment. In some embodiments, a non-adjacent type B node may be a type of network node that is adjacent to an adjacent type B node and can be linked to a non-adjacent seed or type A node via an extension of an existing wired medium between the seed/type A node and the adjacent type B node that is adjacent to the non-adjacent type B node.

In some embodiments, adjacent and non-adjacent type B nodes can be added to the wireless mesh communication network after the completion of a phase where mmW mesh network customer nodes are built and configured by extending a wired link. The locations of adjacent and non-adjacent type B nodes in some embodiments can be picked from a pool of available potential customers based on a marketing phase of the wireless mesh network planning and deployment method. Additionally, through targeted door-to-door sales, other suitable candidates for adjacent and non-adjacent type B nodes can be approached and added to the wireless mesh communication network.

In some embodiments, through a chain of adjacent and non-adjacent type B nodes that connects a seed or type A wireless mesh network node with another seed or type A wireless mesh network node, a very high capacity wired link can be established. This very high capacity wired link can be used for intelligent mesh networking operations including traffic shaping, load balancing, data aggregation, data splitting, etc.

In another aspect, the disclosed systems and methods relate to a private utility or service provider building a wireless mesh network. The private utility or service provider may be a provider other than a high-speed internet data service provider who has customers (e.g., single family home security/automation or solar energy customer) in a certain market or neighborhood and plan to offer high speed internet data services to that market or neighborhood by taking advantage of the existing customers' locations and using the existing customers as anchor homes. In one embodiment, the private utility or service provider can bundle the existing service with new high-speed internet data services to the existing customers. In another embodiment, the private utility or service provider can offer the new high-speed internet data service as an optional service to the existing service customers. In yet another embodiment, the private utility or service provider can offer the new high-speed internet data service for free to the existing service customers.

In one embodiment, an example process of building a high speed wireless mesh network starts with identification of potential wireless mesh nodes on existing service customers who signup for a high-speed wireless internet data service from an existing private utility or service provider and allowing the existing private utility or service provider to deploy and install wireless mesh network gear including ptp/ptmp millimeter wave hardware, antennas, cellular technology based small cells, cables and other associated equipment on their property and/or giving roof access rights. This is followed by line-of-sight analysis to check the line-of-sight connectivity between the existing customer nodes. In one embodiment, in case of line-of-sight connectivity between existing nodes, ptp/ptmp links are established between existing customer nodes of the service provider if certain criteria, including but not limited to received signal strength, line-of-sight with certain minimum number of neighbor homes, etc., are met.

In case of no line-of-sight connectivity between existing customer nodes of the private utility or service provider, planning for intermediary node is performed. In one embodiment, planning for intermediary node involves targeted marketing including door-to-door marketing and online/social media/influencer-based marketing to those potential intermediary customer homes that can help in establishing a line-of-sight ptp/ptmp links-based path between existing customer nodes. In one embodiment, a single intermediary ptp/ptmp link is planned to connect two existing customer nodes. In another embodiment, multiple ptp/ptmp links are planned to connect two existing customer nodes. Next, some of those intermediary home locations are acquired by sale of high-speed internet service to those intermediary customers that sign up for high-speed internet service either as an independent service or as a bundled service where in addition to high-speed internet service, a utility or service is provided to the customer in exchange for allowing the private utility or service provider to deploy and install wireless mesh network gear including ptp/ptmp millimeter wave hardware, antennas, cellular technology based small cells, cables and other associated equipment on their property and/or giving roof access rights to the provider. This is followed by building wireless mesh nodes on the newly acquired intermediary customer sites.

Next, connectivity between the new intermediary nodes and between intermediary nodes and existing customer nodes is created by adding ptp/ptmp links between these nodes. Finally, a wireless mesh network is completed by adding high capacity links to some nodes that connect these nodes to a fiber PoP site that provides connectivity to a core network and data center. Such a site may be referred to herein as a seed site. In one embodiment, seed sites can be built in an initial phase of wireless mesh network deployment before or together with the existing customer sites. In a different embodiment, seed sites can be built in the middle of network deployment or towards the end of network deployment phase.

Accordingly, in one aspect, disclosed herein is a communication system comprising a set of wireless communication nodes that are configured to operate as part of a wireless mesh network. Each respective wireless communication node in the set of wireless communication nodes may be directly coupled to at least one other wireless communication node in the set of wireless communication nodes via a respective short-hop wireless link, and at least a first pair of wireless nodes in the set of wireless communication nodes may be both (a) indirectly coupled to one another via a first communication path that comprises one or more intermediary wireless communication nodes and two or more short-hop wireless links and (b) directly coupled to one another via a first long-hop wireless link that provides a second communication path between the first pair of wireless communication nodes having a lesser number of hops than the first communication path. Further, a fiber access point may be directly coupled to a first wireless communication node of the set of wireless communication nodes.

In another aspect, disclosed herein is a communication system comprising (1) a first set of wireless communication nodes that may be configured to operate as part of a first segment of a wireless mesh network, where each respective wireless communication node in the first set of wireless communication nodes is directly coupled to at least one other wireless communication node in the first set of wireless communication nodes via a respective short-hop wireless link, and where at least a first pair of wireless nodes in the first set of wireless communication nodes are both (a) indirectly coupled to one another via a first communication path that comprises one or more intermediary wireless communication nodes and two or more short-hop wireless links within the first segment of the wireless mesh network and (b) directly coupled to one another via a first long-hop wireless link that provides a second communication path between the first pair of wireless communication nodes having a lesser number of hops than the first communication path, (2) a second set of wireless communication nodes that may be configured to operate as part of a second segment of the wireless mesh network, where each respective wireless communication node in the second set of wireless communication nodes is directly coupled to at least one other wireless communication node in the second set of wireless communication nodes via a respective short-hop wireless link, and where at least a second pair of wireless nodes in the second set of wireless communication nodes are both (a) indirectly coupled to one another via a third communication path that comprises one or more intermediary wireless communication nodes and two or more short-hop wireless links within the second segment of the wireless mesh network and (b) directly coupled to one another via a second long-hop wireless link that provides a fourth communication path between the second pair of wireless communication nodes having a lesser number of hops than the third communication path, and (3) a fiber access point that may be directly coupled to both a first wireless communication node of the first set of wireless communication nodes and a second wireless communication node of the second set of wireless communication nodes.

In yet another aspect, disclosed herein is a method for building a wireless mesh network, the method comprising (1) adding a first set of wireless communication nodes to the wireless mesh network by (a) directly coupling each wireless communication node in the first set of wireless communication nodes to another wireless communication node in the first set of wireless communication nodes via a respective high-capacity long-hop wireless link and (b) directly coupling a first wireless communication node in the first set of wireless communication nodes to a fiber access point, and (2) adding a second set of wireless communication nodes to the wireless mesh network by coupling each wireless communication node in the second set of wireless communication nodes to at least one respective wireless communication node in the first set of wireless communication nodes via respective communication path that includes at least one short-hop wireless link.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

As noted above, the present disclosure relates to wireless networks and communications including, but not limited to, broadband interne services to end user, security and/or automation systems, as well as narrow beam mesh networking and related operations and techniques.

In one aspect, disclosed herein are systems and methods that relate to wireless mesh networks (e.g., narrow beam mesh networks), associated systems, and operations relating to network communication, including, in some embodiments, adjustments and modifications. The disclosed systems and methods may facilitate designing, operating and/or adjusting/modifying wireless networking communications. In some embodiments, the disclosed systems and methods relate to and account for wireless communication nodes that are capable of establishing point-to-point extremely narrow beam communication link, point-to-point steerable extremely narrow beam communication link, point-to-point multiple extremely narrow beam communication link, point-to-multipoint narrow beam communication links, ultra-wide-band point-to-point communication link and a combination of point-to-point and point-to-multipoint communication links, among other possibilities.

In another aspect, disclosed herein are systems and methods that relate to the design of millimeter wave mesh networks, associated systems, and operations relating to network communication, including, in some embodiments, adjustments and modifications. In some embodiments, the disclosed systems and methods relate to and account for designing and constructing a wireless mesh network with long hop links and/or short hop links.

Figure 1:
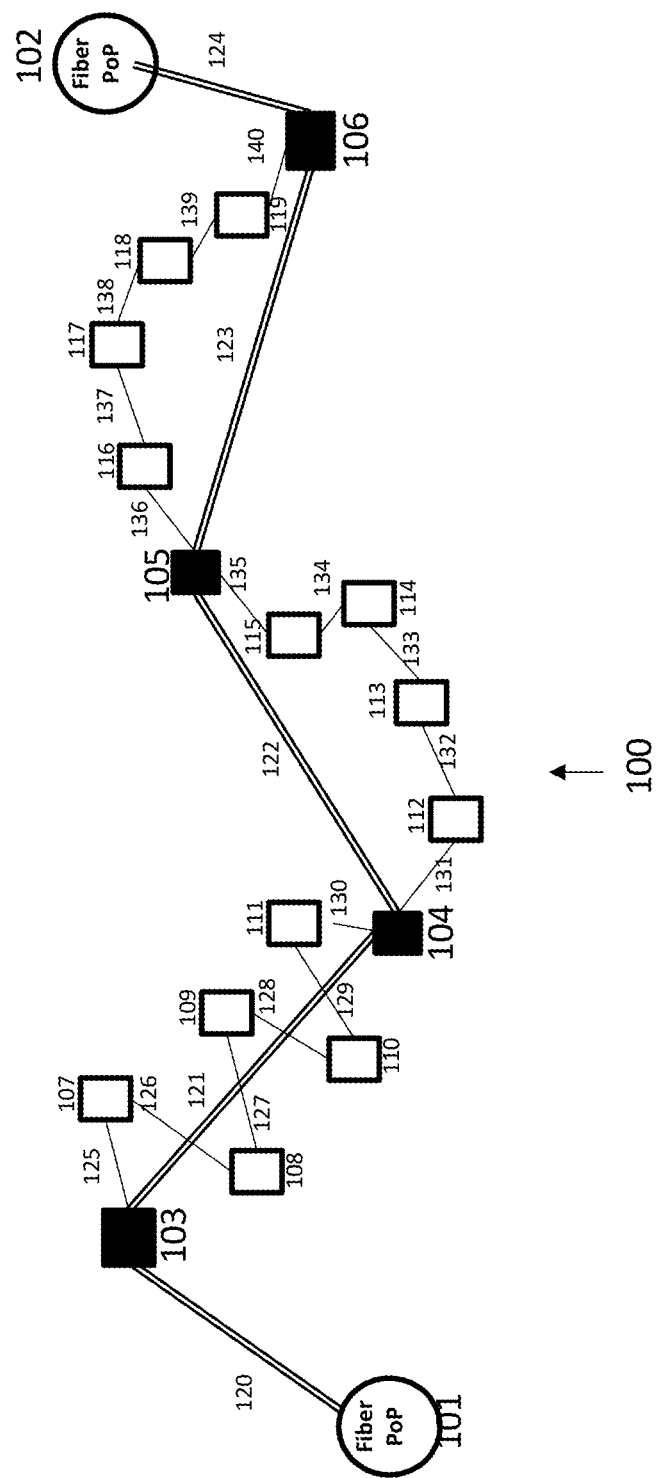
FIG. 1 shows an example diagram relating to wireless networking and communication systems, in accordance with various aspects of this disclosure.

As one example to illustrate, FIG. 1 shows an example data communication network capable of providing multi-gigabit internet speeds through wireless point-to-point and point-to-multipoint links. Communication network 100 in FIG. 1 includes Tower/fiber access points (fiber PoPs) 101 and 102.

Tower/fiber access points 101 and 102 can be co-located or can be located at different physical locations. Tower/fiber access points 101 and 102 have access to high bandwidth dark fiber capable of providing up to several hundred gigabits/second of data throughput. Tower/fiber access points provide backhaul connectivity between the core network/data center (not shown in FIG. 1 for the sake of simplicity) and a seed home of the communication network described below. Tower/Fiber access points 101 and 102 host hardware equipment that establish wireless point-to-point connectivity with communication nodes 103 and 106 respectively.

Specifically, fiber PoP 101 is connected to wireless communication node 103 via the long hop link 120 that is capable of operating on high bandwidth (multiple gigahertz) signals operating at very high frequency (e.g., 6 Ghz~100 Ghz such as 28 Ghz, V band, E band, etc.). Similarly, fiber PoP 102 is connected to wireless communication node 106 via the long hop link 124 that is capable of operating on high bandwidth (multiple gigahertz) signals operating at very high frequency (e.g., 6 Ghz~100 Ghz such as 28 Ghz, V band, E band, etc.).

In addition, wireless communication node 103 is connected to wireless communication node 104 via long hop link 121, wireless communication node 104 is connected to wireless communication node 105 via long hop link 122, and finally wireless communication node 105 is connected to wireless communication node 106 via long hop link 123 as shown in FIG. 1.

The long hops link 120, 121, 122, 123 and 124 may have longer length compared to short hop links. For example, in one embodiment, longer hop links can have 500~600 meters length. In a different embodiment, long hops links can be shorter or longer than 500~600 meters.

Communication network 100 also comprises a number of short hop links as shown in FIG. 1. Specifically, wireless communication node 103 is connected with wireless communication node 107 via the short hop link 125, wireless communication node 107 is connected with wireless communication node 108 via short hop link 126, wireless communication node 108 is connected with wireless communication node 109 via short hop link 127, wireless communication node 109 is connected with wireless communication node 110 via short hop link 128, wireless communication node 110 is connected with wireless communication node 111 via short hop link 129, and wireless communication node 111 is connected with wireless communication node 104 via short hop link 130 to close the zig-zag path of short hop links that originates from wireless communication node 103 and ends at wireless communication node 104.

Similarly, FIG. 1 shows that wireless communication node 104 is connected with wireless communication node 112 via short hop link 131, wireless communication node 112 is connected with wireless communication node 113 via short hop link 132, wireless communication node 113 is connected with wireless communication node 114 via short hop link 133, wireless communication node 114 is connected with wireless communication node 115 via short hop link 134, and wireless communication node 115 is connected with wireless communication node 105 via short hop link 135 to close the path of short hop links that originate from wireless communication node 104 and end at wireless communication node 105.

Likewise, FIG. 1 shows that wireless communication node 105 is connected with wireless communication node 116 via short hop link 136, wireless communication node 116 is connected with wireless communication node 117 via short hop link 137, wireless communication node 117 is connected with wireless communication node 118 via short hop link 138, wireless communication node 118 is connected with wireless communication node 119 via short hop link 139, and wireless communication node 119 is connected with wireless communication node 106 via short hop link 140 to close the path of short hop links that originate from wireless communication node 104 and end at wireless communication node 105.

In this respect, the path of short hop links that connect wireless communication node 103 to wireless communication node 104 is shown to consist of 5 intermediary wireless communication nodes 107-111 and 6 short hop links 125-130. Similarly, path of short hop links that connect wireless communication node 104 to 105 and 105 to 106 each consists of 4 intermediary wireless communications nodes and 5 short hop links. However, it should be understood that wireless communication system 100 can have any number of intermediary nodes in the path of short hop links that connect two wireless communication nodes that are already connected directly to each other via long hop link.

In accordance with the present disclosure, the use of long hop links in combination with short hop links greatly reduces the maximum number of hops that data packets need to pass in order to transport packets between an end user and a fiber PoP. For example, consider an end user associated with wireless communication node 113. In the absence of long hop links 121, 122 and 123, a data packet originated from an end-user connected with wireless communication node 113 would pass through a large number of intermediary wireless communication nodes. For instance, in the event where a packet needs to be transmitted between fiber PoP 101 and wireless communication node 113, the packet would go through 8 intermediary nodes including 112, 104, 111, 110, 109, 108, 107, and 103 under such a scenario where no long hop links are available in the mesh network. However, as shown in the FIG. 1, in the presence of long hop links, the packet would only go through 3 nodes including 112, 104 and 103 as wireless communication nodes 103 and 104 are directly connected via long hop link 121. This greatly reduces the latency or packet delay as packet delay as latency increases linearly with the increasing number of intermediary nodes.

The example above shows how an end-user associated with wireless communication node 113 can benefit from the presence of long hop links for improving the latency or packet delay. However, it should be understood that end-users associated with a large number of wireless communication nodes (especially the ones that are indirectly connected to wireless communication nodes with long hop links) can benefit from the presence of long hop links to improve network latency or packet delay. In addition, the presence of long hop links improve the reliability of the network by increasing the number of available wireless mesh network paths between the source and the destination. For example, an end user associated with wireless communication node 113 can take A) a path consisting of intermediary nodes 112 ← → 104 ← → 103 ← → 101, B) a path consisting of intermediary nodes 112 ← → 104 ← → 111 ← → 110 ← → 109 ← → 108 ← → 107 ← → 103 ← → 101, C) a path consisting of intermediary nodes 114 ← → 115 ← → 105 ← → 106 ← → 102, D) a path consisting of intermediary nodes 114 ← → 115 ← → 105 ← → 116 ← → 117 ← → 118 ← → 119 ← → 106 ← → 102 to connect to the core network. These alternative paths increase reliability of the overall network. For example, in the event that short hop link 125 fails, option B described above for the end user of wireless communication node 113 may not be available. However, other options including A, C and D may still be available to transfer packets or traffic between wireless communication node 113 and the core network.

Bi-directional communication links 120 to 140 shown in FIG. 1 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), non-orthogonal multiple access (NOMA) as described in various generations of communication technologies including 1G, 2G, 3G, 4G, 5G and 6G etc. Bi-directional communication links 120 to 140 formed by the pairs of communication nodes from the set including 101 to 119 are capable of data information transfer via a variety of digital transmission schemes including but not limited to amplitude modulation (AM), phase modulation (PM), pulse amplitude modulation/quadrature amplitude modulation (PAM/QAM), ultra-wide band (UWB) pulse modulation (pico-second pulses), etc.

In FIG. 1, two Tower/fiber access points (PoP) 101 & 102, 5 long hop bi-directional links 120-124 and 16 bi-directional point to point short hop links 125-140 are shown to illustrate an example of a communication network. However, it should be understood that communication network 100 can include a different number of Tower/fiber (fiber PoP) nodes, long hop links, and/or short hop links depending on the specific layout of a particular instantiation of the communication network deployed in the field. Communication network may also contain other nodes (e.g., network switches/routers etc.) that are omitted here for the sake of simplicity.

Figure 2:
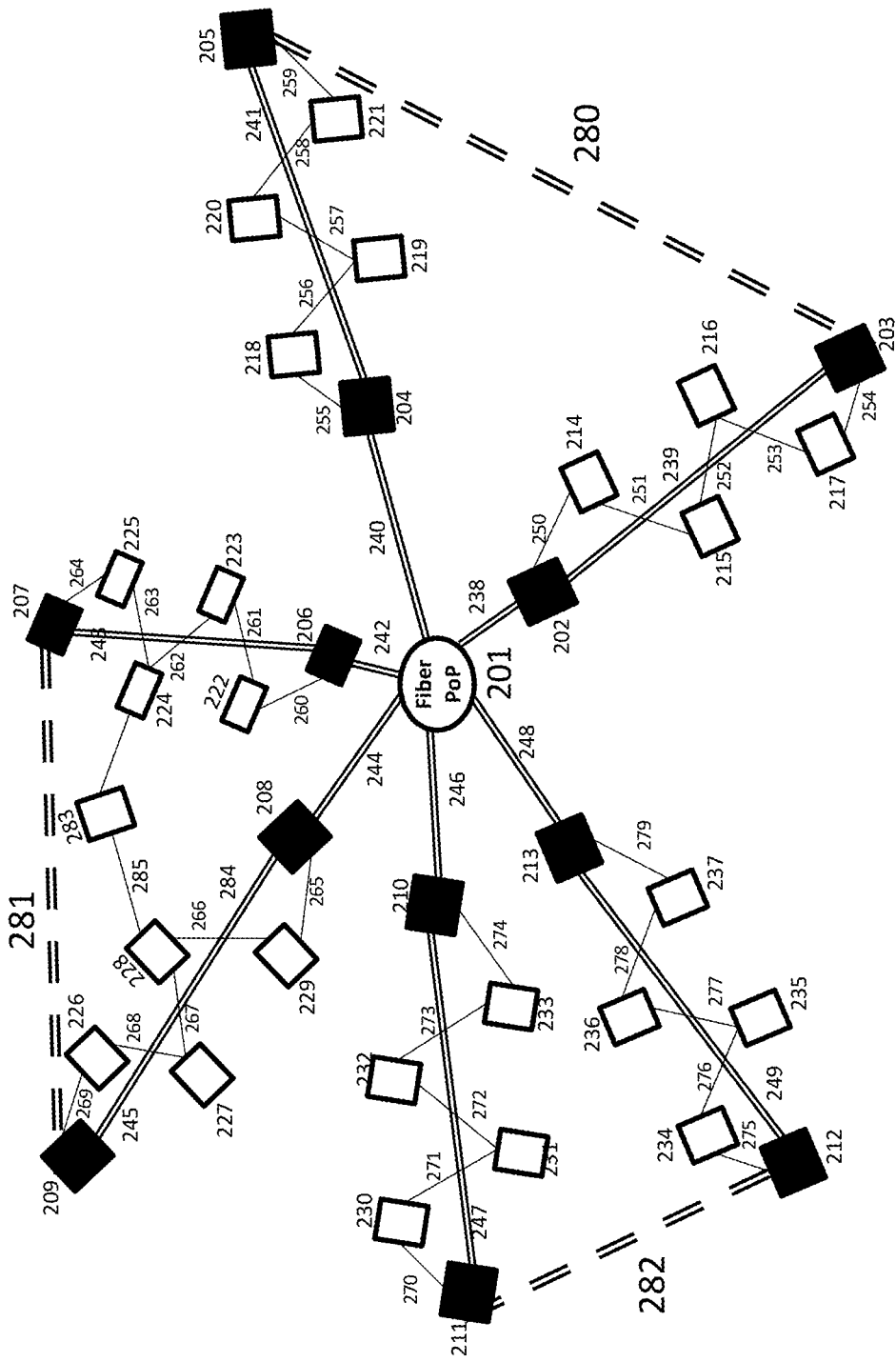
FIG. 2 shows designs illustrating exemplary methods relating to wireless networking and communication systems, in accordance with various aspects of this disclosure.

Referring to FIG. 2, another example layout of a wireless communication network comprising long hop links and short hop links is shown. Specifically, FIG. 2 shows a fiber PoP node 201, a number of segments of long hop links originating from fiber PoP 201 in the shape of wheel spokes, and wireless communication nodes interconnected via short hop links.

For example, long hop links 242 and 243 that connect the nodes 201 to 206 and 206 to 207, respectively, form a segment of long hop links (1st spoke). Similarly, long hop links 244 and 245 that connect node 201 to 208 and 208 to 209, respectively, form another segment of long hop links (2nd spoke). Likewise, long hop links 246 and 247 that connect node 201 to 210 and 210 to 211, respectively, form another segment of long hop links (3rd spoke). In the same manner, long hop links 248 and 249 that connect node 201 to 213 and 213 to 212, respectively, form another segment of long hop links (4th spoke). Similarly, long hop links 238 and 239 that connect node 201 to 202 and 202 to 203, respectively, form another segment of long hop links (5th spoke). Similarly, long hop links 240 and 241 that connect node 201 to 204 and 204 to 205, respectively, form another segment of long hop links (6th spoke).

The different spokes that are formed from segments of long hop links are also interconnected via long hop links. For example, the 1st spoke and 2nd spoke are connected via long hop link 281. Similarly, the 3rd and 4th spokes are connected via long hop link 282 and the 5th and 6th spokes are interconnected via long hop link 280 as shown in FIG. 2.

FIG. 2 shows 6 segments of long hop links or spokes originating from fiber PoP 201. However, it should be understood that a wireless mesh network layout can have any number of spokes, which may depend on the specific terrain of the network, density of homes (potential node locations) and line-of-sight profile.

The example network layout in FIG. 2 also shows a number of wireless communication nodes connected to each other and to those wireless communication nodes that are already connected via long hop links through short hop links. Specifically, wireless communication node 201 is connected to wireless communication node 214 via short hop link 250, wireless communication node 214 is connected to wireless communication node 215 via short hop link 251, wireless communication node 215 is connected to wireless communication node 216 via short hop link 252, wireless communication node 216 is connected to wireless communication node 217 via short hop link 253, and wireless communication node 217 is connected to wireless communication node 203 via short hop link 254 to form a segment of short hop links that connects the wireless communication node 202 and 203, thereby providing an alternative path between nodes 202 and 203.

Similarly, wireless communication node 204 is connected to wireless communication node 218 via short hop link 255, wireless communication node 218 is connected to wireless communication node 219 via short hop link 256, wireless communication node 219 is connected to wireless communication node 220 via short hop link 257, wireless communication node 220 is connected to wireless communication node 221 via short hop link 258, and wireless communication node 221 is connected to wireless communication node 205 via short hop link 259 to form a segment of short hop links that connects the wireless communication node 204 and 205, thereby providing an alternative path between nodes 204 and 205.

Likewise, wireless communication node 206 is connected to wireless communication node 222 via short hop link 260, wireless communication node 222 is connected to wireless communication node 223 via short hop link 261, wireless communication node 223 is connected to wireless communication node 224 via short hop link 262, wireless communication node 224 is connected to wireless communication node 225 via short hop link 263, and wireless communication node 225 is connected to wireless communication node 207 via short hop link 264 to form a segment of short hop links that connects the wireless communication node 206 and 207, thereby providing an alternative path between nodes 206 and 207.

Similarly, other short hop links ranging from 265 to 279 connect a number of wireless communication nodes to each other. Nodes belonging to different spokes or segments of long hop links can also be interconnected via short hop links. For example, node 224 and node 228 are associated with two different spoke or segments of long hop links. However, both 224 and 228 are connected to another wireless communication node 283 via short hop links 284 and 285, respectively, thereby creating a path along wireless mesh network that can connect nodes associated with different spokes via short hop links in addition to long hop links 280, 281 and 282 described above.

In addition, it is also possible to connect any to adjacent spokes via direct long hop links. For example, although not shown in FIG. 2, it is also possible to connect wireless communication node 211 and wireless communication node 209 via a long hop link in the presence of line-of-sight path between 211 and 209. Similar to the example network layout of FIG. 1, the example layout of FIG. 2 comprising long hop links and short hop links greatly reduces the maximum number of links a data packet needs to pass through before reaching a destination. In addition, long hop links increase the reliability of a network by providing alternative paths in the event an original path of traffic flow breaks due to failure of a link (or multiple links).

Figure 3:
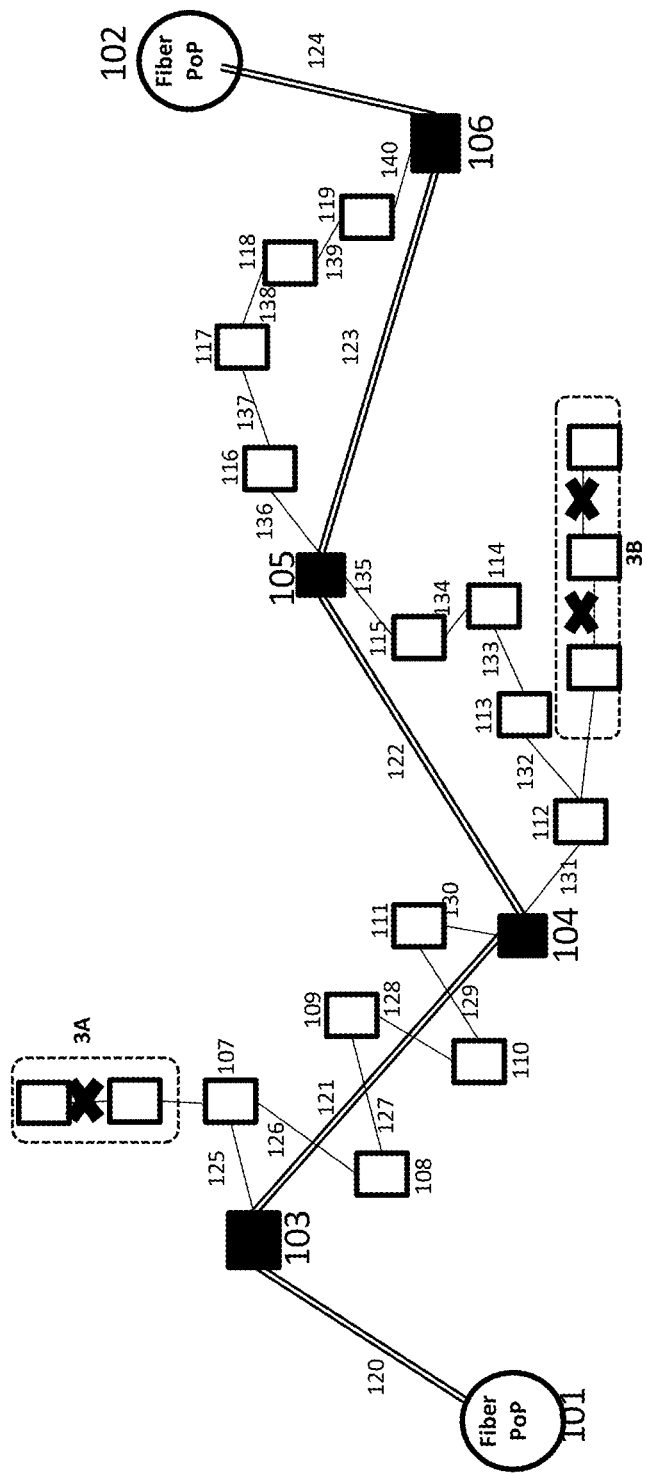
FIG. 3 shows designs illustrating exemplary methods relating to wireless networking and communication systems, in accordance with various aspects of this disclosure.

Referring to FIG. 3, another example mesh network design is depicted, where adjacent short hop links are constrained to not form a straight line in order to avoid mutual interference from adjacent wireless communication nodes. For example, consider segment 3A consisting of two nodes that are directly above wireless communication node 107. The short hop link that connects these two nodes above of node 107 cannot be allowed as it would cause interference to node 107 as their signal propagation path overlaps. Similarly, segment 3B consists of 3 nodes that are on the right side of node 112. The two short hop links in segment 3B cannot be allowed as they may cause interference for node 112 as their signal propagation path overlaps. In general, nodes that are connected via short hop links in such a manner (e.g., in a segment of short hop links that form a straight line) cannot be allowed as they may cause interference among adjacent nodes connected via short hop links.

Figure 4:
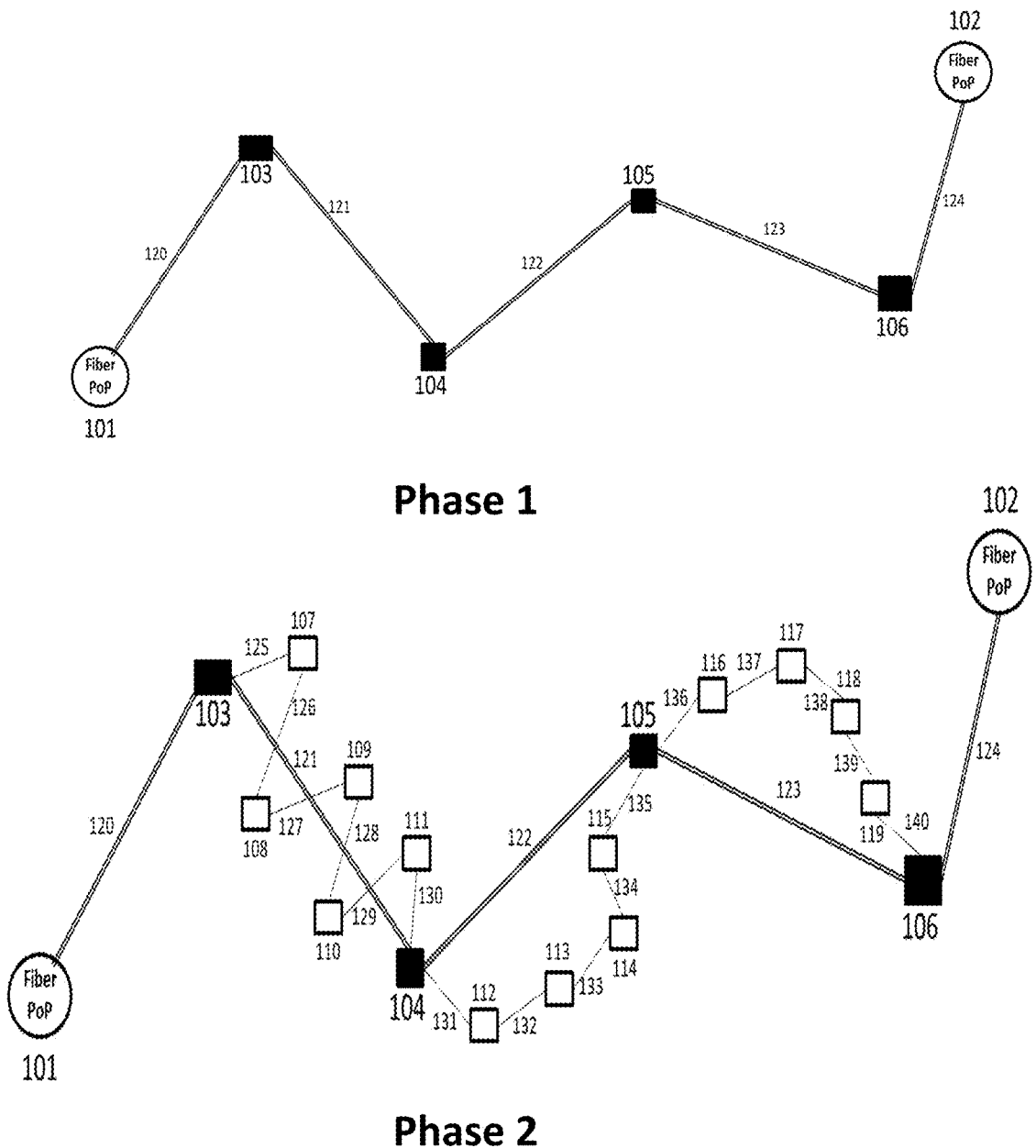
FIG. 4 shows designs illustrating exemplary methods relating to wireless networking and communication systems, in accordance with various aspects of this disclosure.

In accordance with the present disclosure, as noted above, the disclosed wireless mesh network can be built in phases. For example, as shown in FIG. 4, the first phase may involve building the network with only long hop links. This allows quick access and coverage to large areas with a small number of nodes. In the second phase, short hop links may be added to provide connectivity to a large number of end users that are spread over a large region with the help of long hop links that were created in the first phase. Availability of long hop links in the second phase allows easy design of short hop links as segments of short hop links can be terminated at any close by node that is connected to via a long hop link to another node or fiber PoP.

Figure 5:
FIG. 5 shows designs illustrating exemplary methods relating to wireless networking and communication systems, in accordance with various aspects of this disclosure.

FIG. 5 shows an example real-world depiction of techniques and design principles disclosed herein. Black lines in FIG. 5 represent long hop links described in the context of the figures above and white lines represent short hop links that provide connectivity to end users. Long hop links help connect the wireless mesh network to the two fiber PoP shown with black circles in the FIG. 5. It can be readily seen that use of long hop links greatly reduces the maximum number of links a data packet is required to pass through in order to reach from source to destination there by improving the latency and packet delay of the network. As noted above, long hop links also improve the overall network reliability by providing alternate paths for traffic flow in case an original path fails.

According to another aspect of the present disclosure, the disclosed systems and methods may relate to and account for designing and constructing a wireless mesh network comprising high-capacity long hop links.

Figure 6:
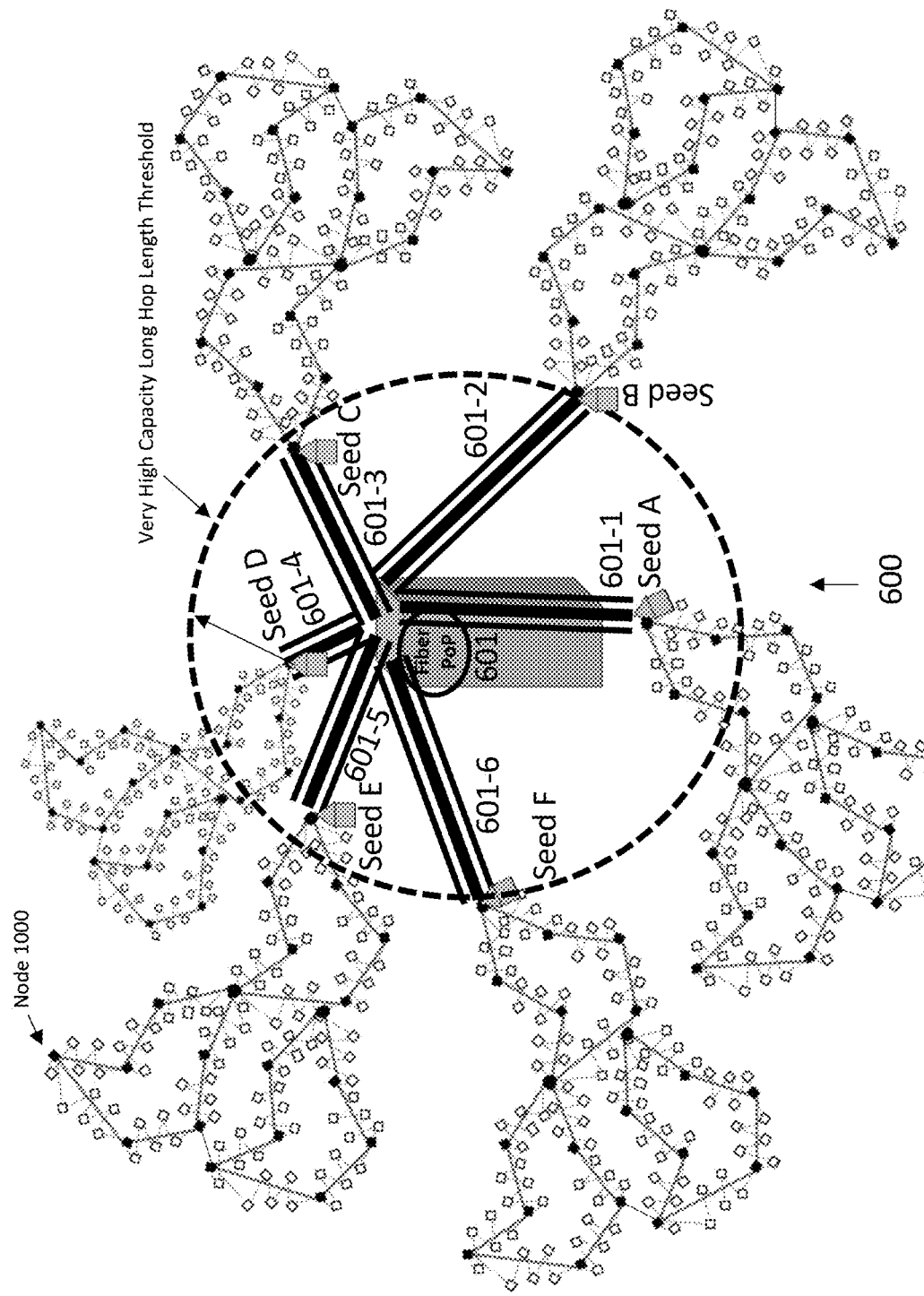
FIG. 6 shows an example diagram relating to wireless networking and communication systems, in accordance with various aspects of this disclosure.

As one example to illustrate, FIG. 6 shows an example communication network 600 based on a ptp/ptmp wireless mesh network. Communication network 600 has fiber PoP 601 that represents a site with the availability of fiber/dark fiber or very high capacity backbone links to the core network. Another consideration in the selection of the site represented by fiber PoP 601 is the height of the building and typically multi-story buildings that provides line-of-sight to a large surrounding area is selected. FIG. 6 also shows that fiber PoP 601 hosts multiple ptp/ptmp narrow beam width nodes that provide capability of establishing several ptp/ptmp high capacity bi-directional links.

Specifically, FIG. 6 shows that fiber PoP 601 location hosts, a ptp/ptmp node that establishes a very high capacity ptp/ptmp link 601-1 with a location seed A that serves as an anchor node for a first cluster of wireless mesh network, a ptp/ptmp node that establishes a very high capacity ptp/ptmp link 601-2 with a location seed B that serves as an anchor node for a second cluster of wireless mesh network, a ptp/ptmp node that establishes a very high capacity ptp/ptmp link 601-3 with a location seed C that serves as an anchor node for a third cluster of wireless mesh network, a ptp/ptmp node that establishes a very high capacity ptp/ptmp link 601-4 with a location seed D that serves as an anchor node for a fourth cluster of wireless mesh network, a ptp/ptmp node that establishes a very high capacity ptp/ptmp link 601-5 with a location seed E that serves as an anchor node for a fifth cluster of wireless mesh network and ptp/ptmp node that establishes a very high capacity ptp/ptmp link 601-6 with a location seed F that serves as an anchor node for a sixth cluster of wireless mesh network.

FIG. 6 shows fiber PoP 601 hosting six very high capacity long hop links connected to six anchor nodes for six clusters of the wireless mesh network. However, it should be understood that fiber PoP 601 can host any number of very high capacity long hop links. Moreover, FIG. 6 shows that each very high capacity long hop link is connected to a single cluster of the wireless mesh network. However, it should be understood that multiple very high capacity long hop links can be connected to a single cluster of the wireless mesh network.

In one embodiment, very high capacity long hop links can provide several Giga bits of capacity. For example, 601-1 to 601-6 very high capacity long hop links in FIG. 6 can provide 10 Gbps capacity and can operate on E-band links. In other embodiments, 601-1 to 606-1 very high capacity long hop links can provide greater than or less than 10 Gbps capacity can be operate on other millimeter wave frequencies ranging from 6 Ghz to 100 Ghz (e.g. 28 Ghz, V band, etc.).

Bi-directional communication links 601-1 to 601-6 shown in FIG. 6 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), non-orthogonal multiple access (NOMA), Single Carrier (SC) transmission as described in various generations of communication technologies including 1G, 2G, 3G, 4G, 5G and 6G etc. Bi-directional communication links 601-1 to 601-6 formed by the ptp/ptmp nodes at fiber PoP 101 and set of seed homes A-F are capable of data information transfer via a variety of digital transmission schemes including but not limited to amplitude modulation (AM), phase modulation (PM), pulse amplitude modulation/quadrature amplitude modulation (PAM/QAM), ultra-wide band (UWB) pulse modulation (pico-second pulses), etc.

FIG. 6 also shows a ring (circle with dash line) that represents a certain threshold that limits the maximum length of a very high capacity long hop link. As shown, very high capacity long hop links 101-1 to 101-6 are inside the dash line circle. The threshold of the dash circle that defines the limit of the maximum length of a very high capacity long hop link can be based on variety of different criteria.

In one embodiment, the threshold can be based on the rain fade margins that guarantees certain data rate or capacity of a link based on a certain amount of rain per unit time or rain zone of a geographical area. That means that although a very high capacity long hop links can have a link length greater than the radius of the cell shown in FIG. 6 during normal operations when there is no rain, the link can either completely break or provide a data rate or capacity that is lower than the required capacity of the link when there is rain/snow, etc. In some other embodiment, the threshold of the dash circle that defines the limit of the maximum length of a very high capacity long hop link can be based on link speed, latency, packet error rate, signal strength, etc., or a combination thereof.

In one embodiment, the threshold can be within a 1 to 2 mile range. In another embodiment, the threshold can be greater than a 1 to 2 mile range or less than a 1 to 2 mile range. Based on the above description, this also implies that all seed locations (e.g. Seed A to Seed F in FIG. 6) are required to be within a threshold distance (e.g., radius of circle) from fiber PoP 601.

It should be understood that while communication Network 600 in FIG. 6 is shown to have one fiber PoP (e.g, fiber PoP 601), communication network 600 can have multiple fiber PoPs, where the number of fiber PoPs may be determined by the availability of buildings with dark fiber, the line-of-sight profile of a given building within the surrounding area, cost (CAPEX and OPEX) of the fiber PoP site to a wireless mesh network operator, among other examples.

In addition to fiber PoP node 601, very high capacity long hop links 101-1 to 101-6, and seed homes A to seed home F, FIG. 6 also shows multiple long hop links and short hop links that form the wireless mesh network and connects an end user to communication network 600 with the help of ptp/ptmp links that were described above. Specifically, a link that connects two solid black nodes (small square/circle) in FIG. 6 represents a long hop link, where the length of a long hop link is typically between 400~600 meters. A link between two white nodes (small square) or between a white node and a solid black node (small square/circle) in FIG. 6 represents a short hop link.

As noted above, the use of long hops links can greatly reduce the number of hops required by the data packets between the end user and the core network. For example, consider node 1000 that is located at the far north west section of communication network 600 in FIG. 6. Packets from node 1000 can reach seed home E with 6 long hop links and ultimately to fiber PoP 601 with 7 hops, whereas without longs hop links, packets from customer node 1000 would requires more than 30 hops to reach fiber PoP 601, which can exceed the latency requirements or other performance requirements of a data application used by an end user at node 1000.

It is to be noted here that a cluster's capacity may be limited by the total capacity of a very high capacity long hop link that connects a wireless mesh network cluster to fiber PoP 601 or the core network. For example, consider Seed A that serves as an anchor node for the wireless network's first cluster and connects the first wireless mesh network cluster to the fiber PoP via very high capacity long hop link 601-1. This first wireless mesh network cluster's maximum capacity may be limited to the maximum capacity of the ptp/ptmp very high capacity long hop link 601-1.

It is also to be noted here that Seed A that serves as an anchor node may aggregate multiple ptp/ptmp long and short hop links of the wireless mesh network cluster. Hence the total network traffic carried by Seed A from the first cluster to the fiber PoP 601 via ptp/ptmp very high capacity long hop link 601-1 is limited to the total sum of the capacities of all the long and short hop links that terminate at Seed A. Hence the maximum traffic that can flow between a wireless mesh network cluster and the core network may be defined by the minimum of the capacity of a very high capacity long hop link and the sum capacity of all the long and short hop links that terminate at an anchor node (e.g., MIN(Capacity of Very High Capacity Long Hop Link, SUM(Capacities of Short and Long Links terminating at anchor/seed node))).

Figure 7:
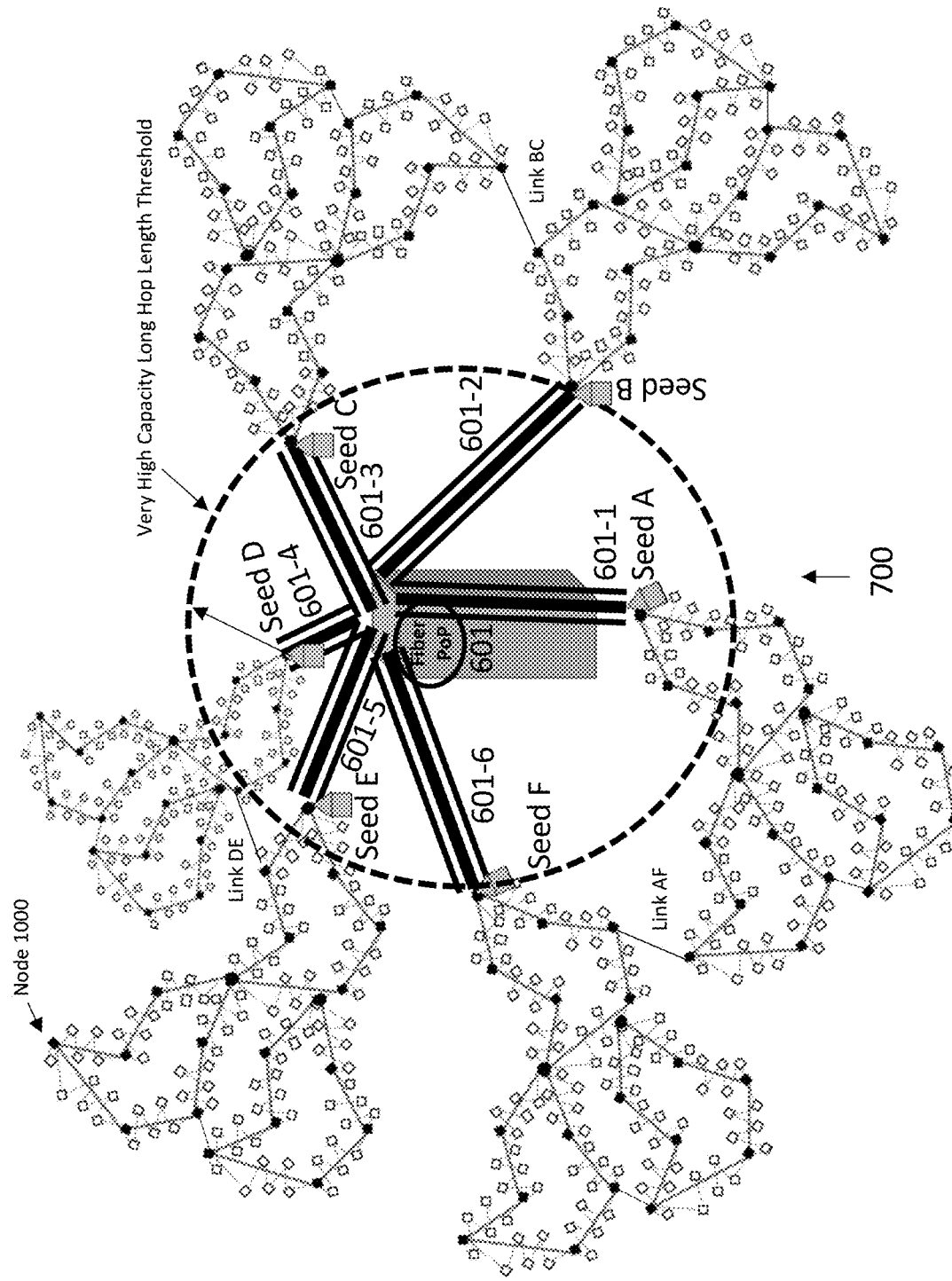
FIG. 7 shows designs illustrating exemplary methods relating to wireless networking and communication systems, in accordance with various aspects of this disclosure.

Referring to FIG. 7, communication network 700 is shown that is similar to the communication network 600 shown in FIG. 6 and described earlier in the disclosure. Additionally, network 700 includes some ptp/ptmp links that connect two adjacent wireless mesh network clusters. Specifically, ptp/ptmp link AF connects first wireless mesh network cluster to the sixth wireless mesh network cluster, ptp/ptmp link BC connects the second wireless mesh network cluster to the third wireless mesh network cluster and ptp/ptmp link DE connects the fourth wireless mesh network cluster to the fifth wireless mesh network cluster. The links AF, BC and DE can be short hop links or long hop links.

In FIG. 7, 3 links AF, BC and DE are shown that connect two adjacent wireless mesh network clusters. However, it should be understood that any number of links can be used in communication network 700 that can connect any number of adjacent wireless mesh network clusters.

Generally speaking, the links AF, BC and DE help in increasing the reliability of the network by providing alternate paths on network 700 for data packets to travel from a source to a destination. In addition, the links AF, BC and DE may help in balancing the load between adjacent wireless mesh network clusters they connect. Hence in an example scenario that involves high load in the first cluster of wireless mesh network of the communication network 700 where a very high capacity long hop link or long/short hop links terminating at Seed A node get congested, data traffic can be re-routed through another cluster (e.g., the sixth wireless mesh network cluster) and very high capacity long hop link 601-6 via link AF that connects the first and sixth wireless mesh network clusters of communication network 700.

Similarly, the 2nd and 3rd wireless mesh network clusters can use link BC for traffic load balancing and increasing reliability of their respective clusters, and the 4th and 5th wireless mesh network clusters can use link DE for traffic load balancing and increasing reliability of their respective clusters. However, based on the discussion above with respect to FIG. 6, links AF, BC and DE do not add to the total capacity of the network cluster as total capacity depends on the sum capacity of the long/short hop links terminating at a seed node and the capacity of very high capacity long hop links. Hence, in order to increase the total capacity of the wireless mesh network, other design techniques need to be adopted as explained in the following.

Figure 8:
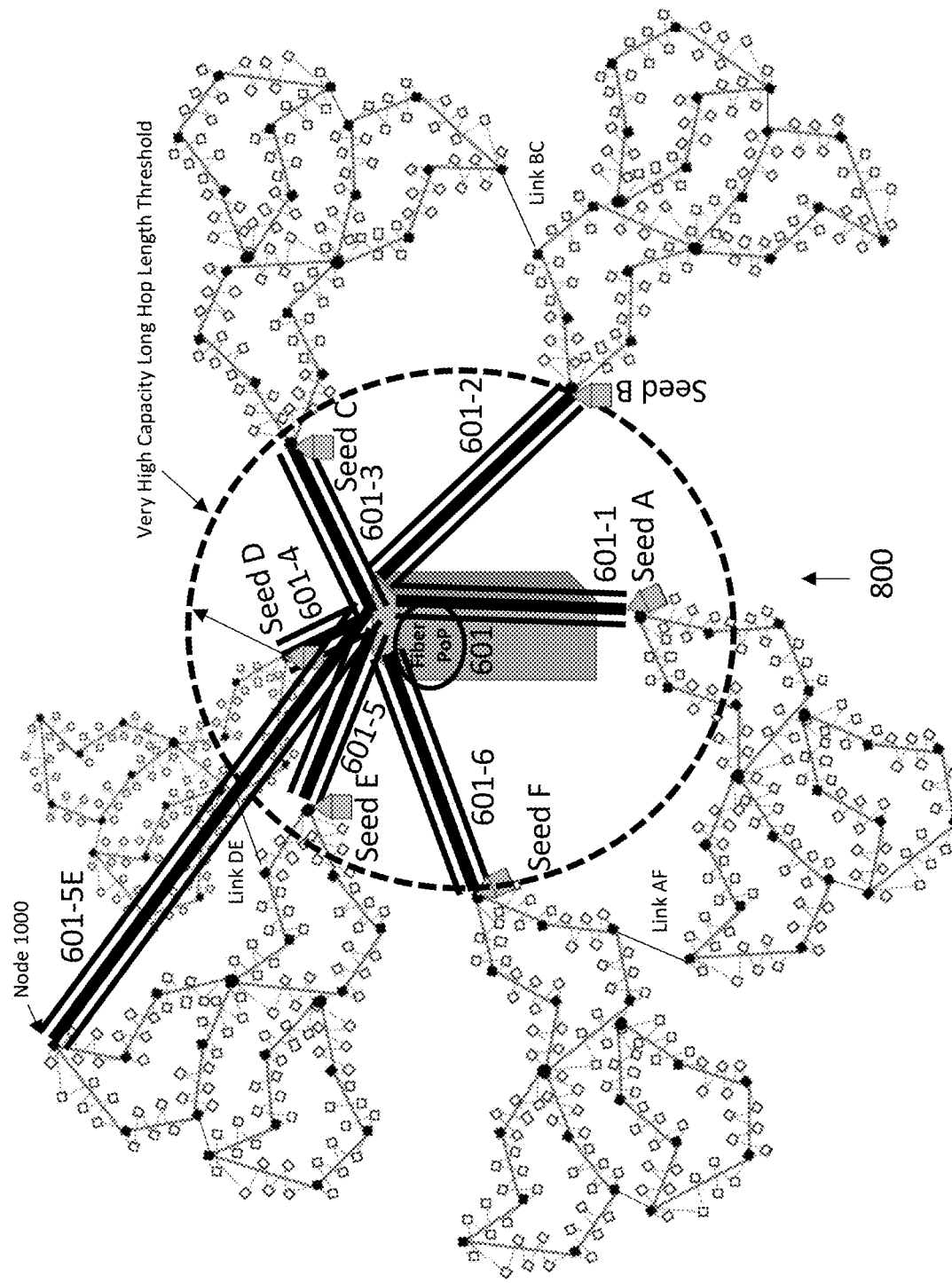
FIG. 8 shows designs illustrating exemplary methods relating to wireless networking and communication systems, in accordance with various aspects of this disclosure.

Referring to FIG. 8, a communication network 800 is shown that is similar to the communication networks 600 and 700 shown in FIGS. 6-7, respectively. FIG. 8 additionally shows a very high capacity very long hop link 601-5E that connects node 1000 of the 5th cluster of the wireless mesh network to fiber PoP 601. It is to be noted here that very high capacity very long hop link 601-5E uses similar technology as that of very high capacity long hop link 601-5. However, the length of very high capacity very long lop link 601-5E may be much greater than very high capacity long hop link 601-5 and may exceed the maximum length threshold as defined by the circle with dash lines. Hence, performance and capacity of the very high capacity very long hop link 601-5E can differ during certain events described earlier. For example, in one embodiment, the length of very high capacity very long hop link 601-5E can exceed the length that is allowed by the link budget (Maximum Allowable Path Loss) that includes a rain fade margin. Hence, during normal network operations without any rain, very high capacity very long hop link 601-5E can work similar to (with possibility of some capacity degradation but within acceptable range) very high capacity long hop link 601-5, but in the event of rain, the capacity of very high capacity very long hop link 601-5E can degrade below the acceptable level or can completely break.

In other embodiments, degradation can occur due to other reasons that were explained in the context of FIG. 6. Hence, a very high capacity very long hop link can provide benefits during normal network operations and during certain events where the capacity of the very high capacity very long hop link degrades below the acceptable level, wireless communication network 800 can fall back to network configurations described in the context of FIGS. 6-7.

During normal network operations, very high capacity very long hop link 601-5E provides additional capacity to the wireless mesh network clusters. For example, in FIG. 8, total maximum capacity of the 4th and 5th clusters that are connected together is defined as the sum of the minimum of very high capacity (very) long hop link and the sum of total capacity of the short and long hop links connected to anchor nodes (e.g., Seed E, Seed D and Node 1000). Mathematically, for example, total capacity of the two connected wireless mesh network of the 4th and 5th clusters is defined as: MIN (Capacity of 601-5E, SUM (capacities of long and short hop link terminating at node 1000))+MIN (Capacity of

601-5, SUM (capacities of long and short hop link terminating at Seed E))+MIN (Capacity of 601-4, SUM (capacities of long and short hop link terminating at Seed D)).

In FIG. 8, very high capacity very long hop link 601-5E is shown to be directly connected to a single mesh network cluster and indirectly connected to another wireless mesh network cluster via link DE. However, it should be understood that a node at another location in a mesh network cluster (not shown in FIG. 8) can be picked as an anchor node for very high capacity very long hop link 601-5E such that very high capacity very long hop link 601-5E can be connected directly to multiple wireless mesh network clusters.

Generally speaking, the presence of very high capacity very long hop links (e.g., very high capacity very long hop link 601-5E) can help reduce the latency for nodes in a wireless mesh network that are at far distance from fiber PoP 601 and data packets from such nodes are required to go through multiple hops even in the presence of long hop links. For example, in case of node 1000, which originally required a minimum of 7 long hops for data packets from node 1000 to fiber PoP 601 as described above, node 1000 in communication network 800 may now require only a single hop via very high capacity very long hop link 601-5E to reach fiber PoP 601. Similarly, the presence of very high capacity very long hop link 601-5E helps reduce the latency or packet delay of nodes in the wireless mesh network that are close neighbors of the node 1000.

Figure 9A:
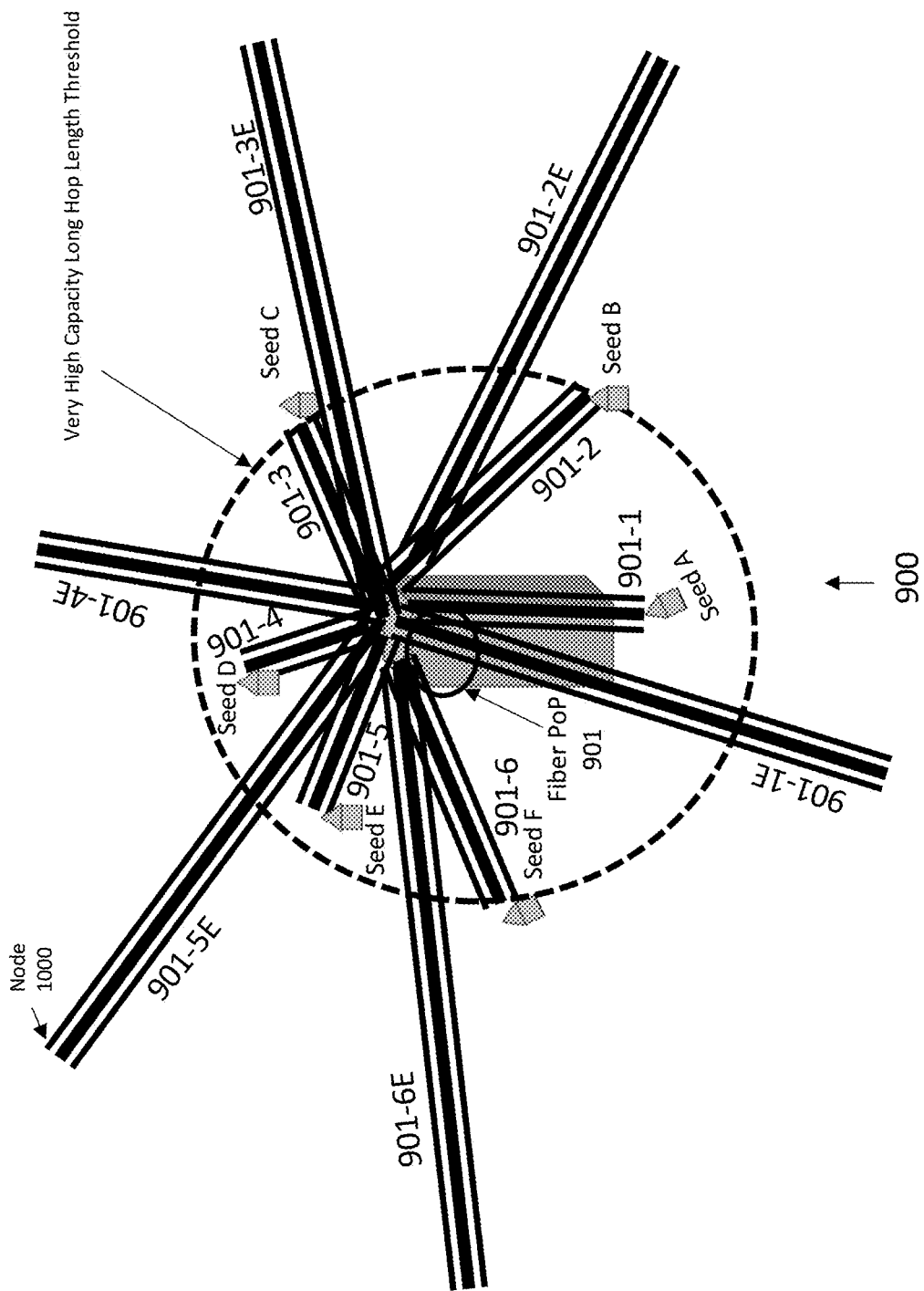
FIG. 9A shows designs illustrating exemplary methods relating to wireless networking and communication systems, in accordance with various aspects of this disclosure.
Figure 9B:
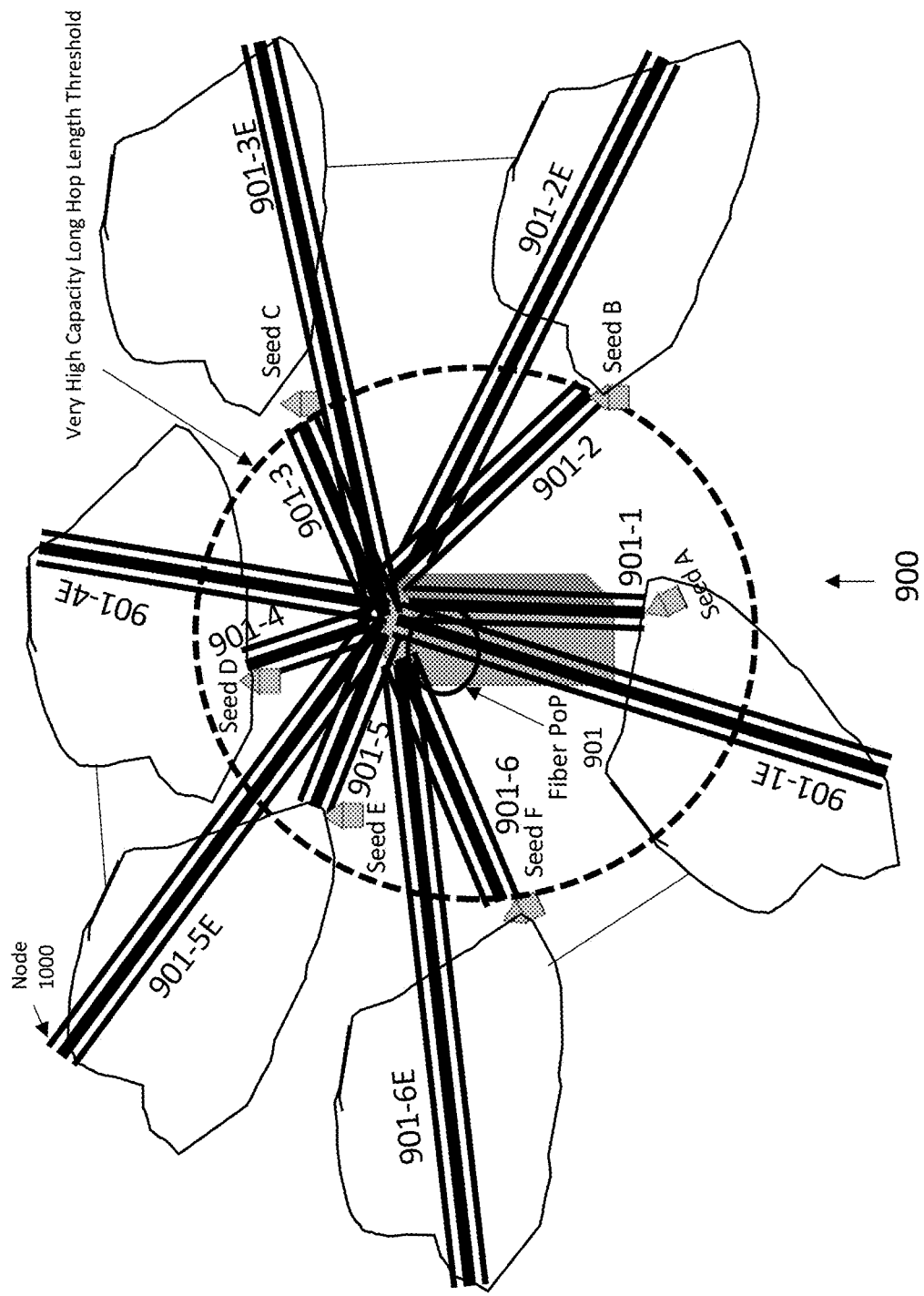
FIG. 9B shows designs illustrating exemplary methods relating to wireless networking and communication systems, in accordance with various aspects of this disclosure.

In some embodiments, wireless mesh network of communication network 800 of FIG. 8 comprising short/long/very high capacity long/very high capacity very long hop links can be built in phases. To illustrate, FIGS. 9A and 9B depict an example wireless mesh network comprising short hop links, long hop links, very high capacity long hop links, and very high capacity very long hops links that can be built in phases. For instance, as shown in FIG. 9A, a first phase may involve building the network with only very high capacity long hop links and very high capacity very long hop links. This allows quick access and coverage to large areas with a small number of nodes. Specifically, FIG. 9A shows construction/deployment of six very high capacity long hop links 901-1, 901-2, 901-3, 901-4, 901-5 and 901-6 that connect Seed A, Seed B, Seed C, Seed D, Seed E and Seed F, respectively, to fiber PoP 901. As shown, very high capacity long hop links 901-1 to 901-6 are within the circle with dash lines whose radius determines the length of each of the very high capacity long hop links. FIG. 9A also shows construction (during the first phase) of six very high capacity very long hop links 901-1E, 901-2E, 901-3E, 901-4E, 901-5E and 901-6E that provide direct connectivity between fiber PoP 901 and wireless mesh network nodes that are at a far distance from fiber PoP 901.

In the second phase, as shown in FIG. 9B, wireless mesh network clusters based on short hop links and long hop links are added to communication network 900 thereby providing fixed access network services to a large number of end users.

In FIGS. 9A and 9B, six very high capacity long hop links, six very high capacity very long hop links and six wireless mesh network clusters comprising long and short hop links are shown. However, it should be understood that communication network 900 can have any number of very high capacity long hop links, very high capacity very long hop links and/or wireless mesh network clusters, and the number of links may vary depending on the specific network layout and distribution of wireless mesh network nodes in a geographical coverage area surrounding fiber PoP 901 or multiple fiber PoPs (not shown in the figure). Further, FIGS. 9A and 9B depicts one embodiment of communication network 900 constructed in two phases. However, it should be understood that wireless communication network 900 can be built in a single phase, where all the different types of links are deployed in parallel, or in more than two phases, where different types of links are deployed in different phases.

In yet another aspect of the present disclosure, a wireless mesh network may be constructed with one or more of (1) seed nodes, (2) type A nodes, (3) adjacent type B nodes, or (4) non-adjacent type B nodes.

Figure 10:
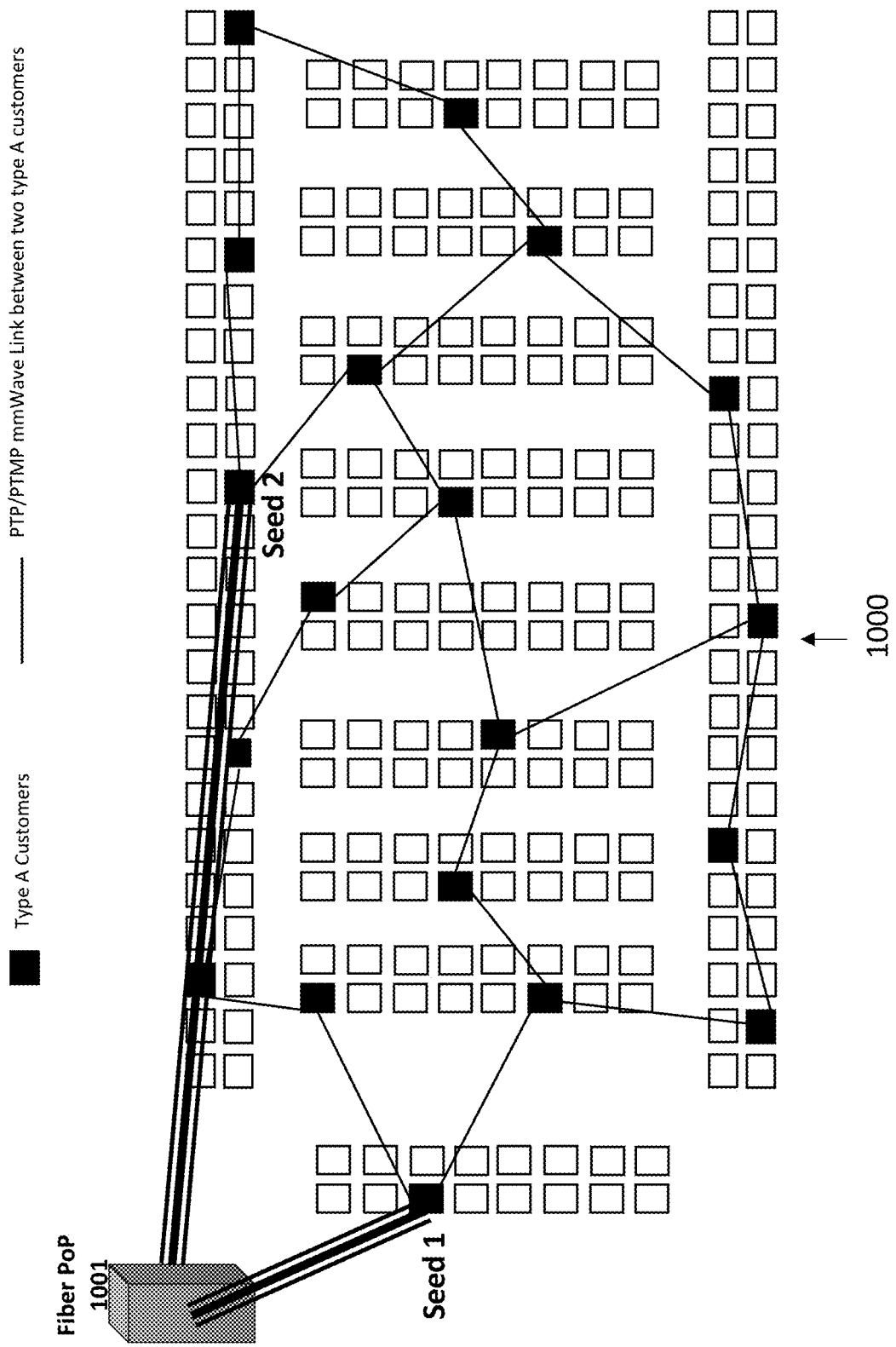
FIG. 10 shows an example diagram relating to wireless networking and communication systems, in accordance with various aspects of this disclosure.

To illustrate, FIG. 10 depicts communication network 1000 based on ptp/ptmp wireless mesh links. Communication network 1000 comprises fiber PoP 1001 that may represent a site that has fiber/dark fiber or very high capacity backbone links available to communicate with the core network or data center. The site of fiber PoP 101 may be selected based on the height of a building (e.g., a multi-story building) that is high enough to provide line-of-sight to a large surrounding area. FIG. 10 also shows that fiber PoP 1001 has two high capacity narrow beam width nodes that provide capability of establishing two ptp/ptmp high capacity bi-directional links between fiber PoP 1001 and seed nodes 1 and 2.

As further shown in FIG. 10, wireless mesh network nodes are represented by solid black squares, while white squares represent homes in the neighborhood that are not selected (at least initially) to be part of wireless mesh communication network 1000. Both seed nodes 1 and 2 are special type of wireless mesh network nodes. Seed nodes 1 and 2 host two types of communication equipment: 1) equipment for supporting ptp/ptmp mmWave wireless links, each represented in FIG. 10 with a thin black line, with other regular wireless mesh network nodes called type A nodes and/or seed homes and 2) equipment for supporting high capacity ptp/ptmp mmWave links, each represented in FIG. 10 with a triple compound line, with fiber PoP 1001 providing connectivity to the core network.

Communication network 1000 of FIG. 10 shows two seed homes and two high capacity ptp/ptmp mmWave connecting two seeds homes (e.g., Seed 1 and Seed 2) to fiber PoP 1001. However, it should be understood that communication network 1000 may comprise any number of seed homes and corresponding number of links for connectivity to fiber PoP 1001 or multiple fiber PoPs. FIG. 10 also shows seventeen type A customer nodes and two seed home nodes in the communication network 1000. However, it should be understood that communication network 1000 can have any number of wireless mesh network nodes, including seed home nodes and type A nodes.

In practice, the wireless mesh network communication equipment (e.g., antennas, RF and digital circuitry, routers, switches, etc.) deployed on type A customer nodes and seed home nodes are typically powered using the same power source that provides power to a home hosting a wireless mesh network node. Moreover, there may be a backup power supply that can provide power for some time (usually 1~2 hours) in an event of a power outage to the home hosting a wireless mesh network node. However, in an event of a power outage that lasts for an extended period of time beyond the backup power supply run time, the wireless mesh network equipment will shut down. This can impact not only the wireless mesh communication node with the power outage but also other wireless mesh communication network nodes (e.g., type A customer nodes) that have data pass through the wireless mesh communication node impacted by the power outage. For example, in FIG. 10, if Seed 1 wireless mesh communication node goes down due to an extended power outage, a major portion of the wireless mesh communication network may be impacted. For instance, the type A nodes that are close to Seed 1 may be required to reroute their data via Seed 2. In an event where both Seed 1 and Seed 2 go down, the entire wireless mesh communication network is impacted. However, in case of an event where a type A customer node at the far edge of the wireless mesh communication network is impacted due to an extended power outage, the impact is usually localized, although undesired.

Figure 11:
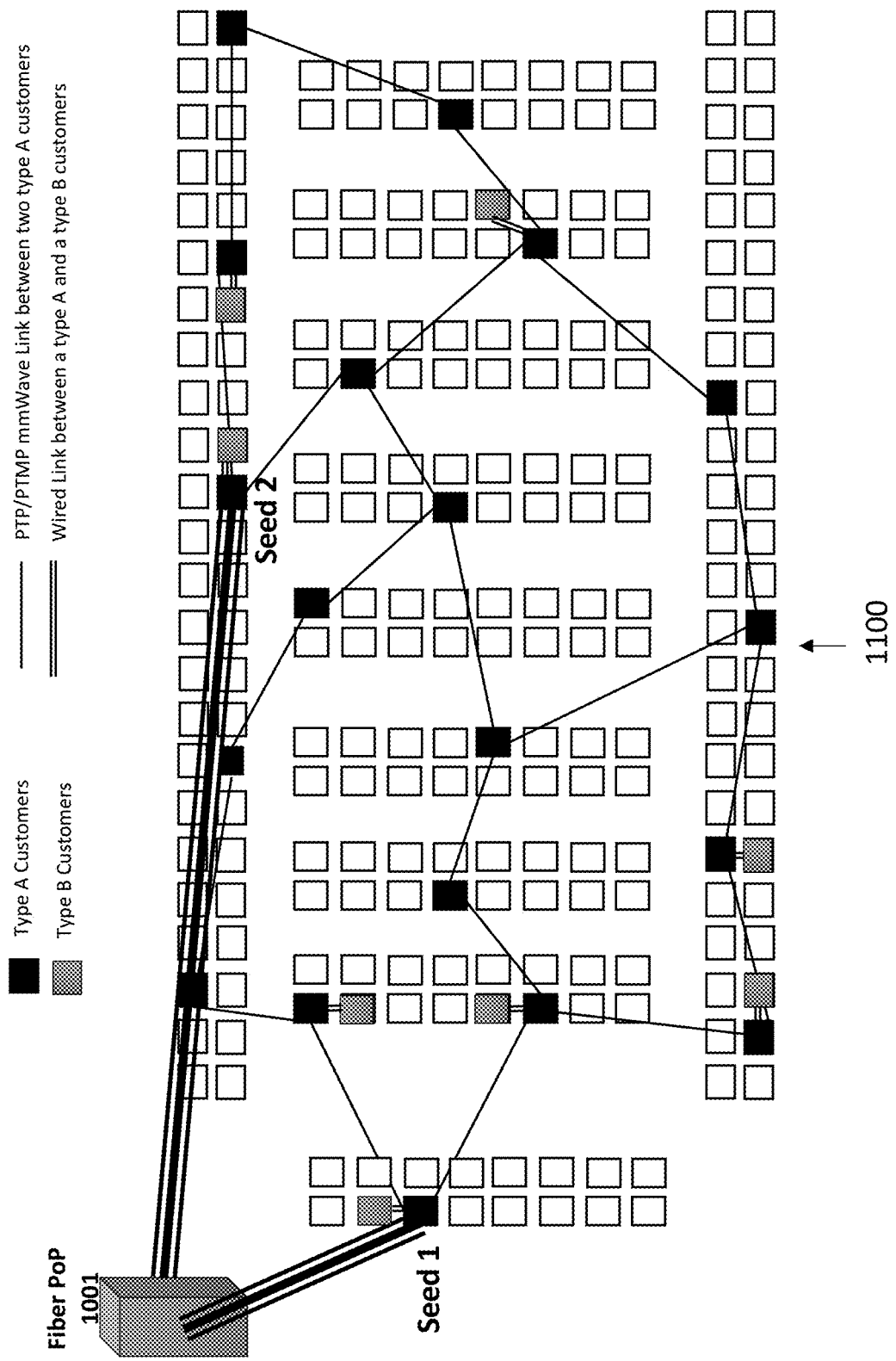
FIG. 11 shows designs illustrating exemplary methods relating to wireless networking and communication systems, in accordance with various aspects of this disclosure.

Referring to FIG. 11, example communication network 1100 is shown. Similar to communication network 1000 of FIG. 10, communication network 1100 of FIG. 11 comprises fiber PoP 1001, Seed nodes 1 and 2, high capacity ptp/ptmp links between the seed nodes and fiber PoP 1001, multiple type A wireless mesh network customer nodes and ptp/ptmp links connecting type A nodes with other type A nodes and/or seed nodes. In addition, FIG. 11 shows multiple type B customer nodes represented by grey color squares. These type B nodes are connected to type A nodes or seed nodes via a wired link. The wired link may take various forms, including but not limited to copper wire, coaxial copper cable, unshielded twisted pair categories 3, 4, 5, 5e, 6, 6A, 7, 7A, 8/8.1, 8.2, plastic optical fiber, glass optical fiber, among other examples. Since type B nodes are directly connected to a wireless mesh network communication node via a wired link, no additional mmW wireless communication equipment, such as mmWave antennas, RF and digital circuitry, etc., is required other than the usual modem to terminate the wired link at the type B customer node and wireless/wired router to provide internet data connectivity to the end customer of the type B node.

Accordingly, in one embodiment, a wireless mesh network operator can provide internet data services to customers of type B nodes at subsidized rates. In another embodiment, a wireless mesh network operator can provide internet data services to type B node customers at regular rates. Moreover, via the wired link that connects a type B node to wireless mesh communication network equipment at a type A or a seed node, the type B node can also serve as an alternate source to power the wireless mesh communication network equipment hosted by a type A or seed node site. For example, a type B node customer located above the Seed 1 node site is shown in FIG. 11 via a double compound wired link connected to the Seed 1 node site. Over a wired cable medium (e.g., power over ethernet (PoE), power over optical, power over copper, etc.), the type B customer node can provide an alternate power source to the wireless mesh communication equipment at Seed 1 node. In some embodiments, a dedicated power cable can also be used to supply power by a type B node to mmWave mesh communication network equipment. Similarly, a type B node located to the right of Seed 2 node in FIG. 11 can provide an alternate source to power wireless mesh communication equipment located at the Seed 2 node site in the event of an extended power outage at the Seed 2 node site beyond the run time of a backup power supply for the Seed 2 node. Similarly, FIG. 11 shows several other type B nodes connected to respective adjacent type A nodes via a wired link discussed above, thereby providing alternate power supply options for mmW wireless mesh equipment at the respective node A sites.

In one embodiment, as shown in FIG. 11, type B nodes are located at homes adjacent to seed nodes or type A nodes. However, it should be understood that type B nodes are not required to be located at homes adjacent to seed or type A nodes. For example, in another embodiment, there can be a single or multiple homes between a type B node and a type A node or a seed node.

In accordance with the present disclosure, building a wireless mesh network may involve various phases to plan and construct the wireless mesh network. For instance, in one example implementation, building a wireless mesh network may involve a pre-marketing phase that may include various subphases to generate leads for potential locations of customers that expressed interest in subscribing to an internet service for the disclosed wireless mesh network. The subphases may involve social media/online marketing, radio/television-based marketing, and/or mailer-based marketing, among other possible marketing approaches.

Based on the leads for potential locations of customers, an area of interest is identified that is used during a geo specific marketing and sales phase, which may involve door-to-door marketing and sales and a door-to-door marketing and sales agent accessing a computing device to upload potential customer information that is provided to a network planning engine. The network planning engine may then select a subset of locations of customers based on various criteria for wireless mesh network installation and deployment. Building a wireless mesh network may involve various other phases to plan and construct a wireless mesh network as well.

Figure 12:
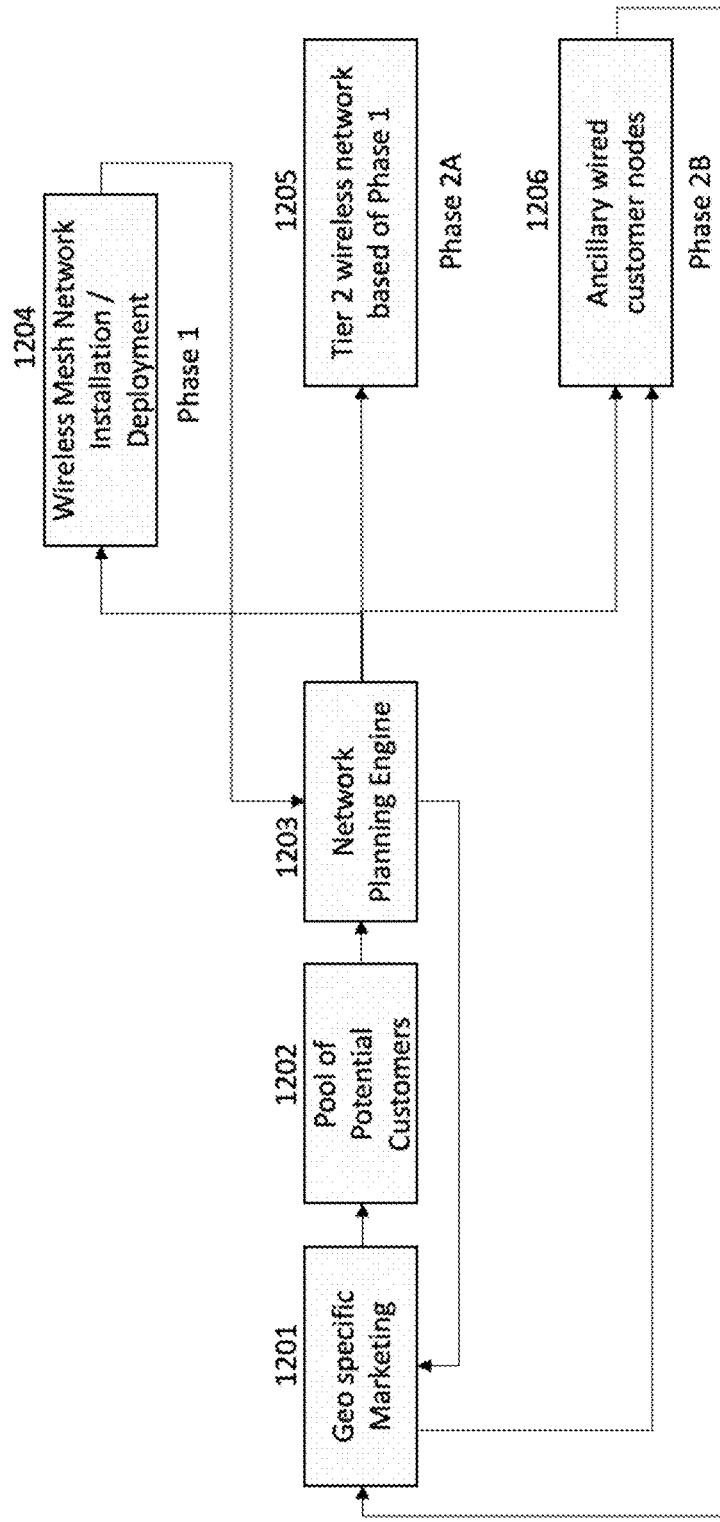
FIG. 12 shows designs illustrating exemplary methods relating to wireless networking and communication systems, in accordance with various aspects of this disclosure.

As one specific example to illustrate, FIG. 12 illustrates an example high-level wireless mesh communication network planning and design method. In particular, FIG. 12 shows geo specific marketing block 1201, pool of potential customer block 1202, network planning engine block 1203, wireless mesh network installation/deployment block 1204, tier 2 wireless network based on phase 1 block 1205, and ancillary wired customer node block 1206.

For purposes of illustration only, the example blocks shown in FIG. 12 represent different phases of a wireless mesh communication network planning and deployment method. It should be understood that the blocks in FIG. 12 are merely described in such manner for the sake of clarity and explanation and that some blocks may be carried out in various other manners as well, including the possibility that example blocks may be added, removed, rearranged into different orders, grouped together, and/or not grouped together at all.

At a high level, block 1201 represents different marketing approaches such as door-to-door marketing and sales (and possibly some pre-marketing approaches noted above, such as social media/online marketing, radio/television-based marketing, and/or mailer-based marketing, etc.) within a certain area of interest (AOI) defined on the basis of multiple factors, which may include the availability of a building with fiber connectivity at a reasonable cost, the level of vegetation in the area, population density, demographics, and/or average annual household income, among other factors. Based on the marketing phase 1201, a pool of potential customers is created at block 1202 which is then fed to network planning engine 1203, where based on certain criteria, a subset of customer locations from 1202 is selected and forwarded to wireless mesh network installation and deployment phase 1204 for the construction of a wireless mesh communication network. Block 1204 may also be referred to as Phase 1. Based on this phase, subsequently in Phase 2A, communications equipment belonging to a different technology type at customer nodes constructed during phase 1 may be deployed, and a different tier of a wireless communication network may be built that can serve other pool of potential customers created at block 1202, which are not picked as wireless mesh network nodes in phase 1 using a different technology tier. In addition, opportunistically in phase 2B, certain potential customers from block 1202 which are not picked in phase 1 and 2A and are suitable for type B customer nodes can be selected to become ancillary wired customer nodes or type B nodes. These ancillary nodes or type B nodes are required to be in close proximity of the seed or type A nodes, so that a wired link can be built between these ancillary nodes and the seed or type A node without too much complexity and cost.

In a preferred embodiment, a type B node is built on a potential customer location that is adjacent to an existing seed or type A home. This way, ancillary wired customer node or type B node gets high speed internet service without requirement for the mmWave based wireless mesh equipment and at the same time the type A or seed node gets an alternate source for power supply from an ancillary wired customer node.

In one embodiment, phase 2A of FIG. 12 can take place before phase 2B, thereby giving phase 2A opportunity to pick customers from a relatively larger pool of remaining potential customers at block 1202, which are not picked in phase 1. In this case, in phase 2B, ancillary wired customer locations meeting type B customer criteria are picked that are left in the pool of potential customers after phase 1 and phase 2A. The feedback loop from blocks 1206 to block 1201 shows that the targeted door-to-door marketing and sales phase where certain potential homes ideal or suitable for type B nodes are targeted that are not in the pool of potential customers at block 1202. From sales of this targeted phase at block 1201, type B customer nodes are built directly as shown in FIG. 12.

In another embodiment, phase 2B of FIG. 12 can take place before phase 2A, thereby giving phase 2B opportunity to pick ancillary wired customers or type B nodes from a relatively larger pool of remaining potential customers at block 1202 which are not picked in phase 1. In this case, in phase 2A, tier 2 wireless customer locations are picked that are left in the pool of potential customers after phase 1 and phase 2B. The feedback loop from blocks 1206 to block 1201 shows that the targeted door-to-door marketing and sales phase where certain potential homes ideal or suitable for type B nodes are targeted that are not in the pool of potential customers at 1202. From sales of this targeted phase at block 1201, type B customer nodes are built directly as shown in FIG. 12. In another embodiment, phase 2A and 2B can take place in parallel.

Figure 13:
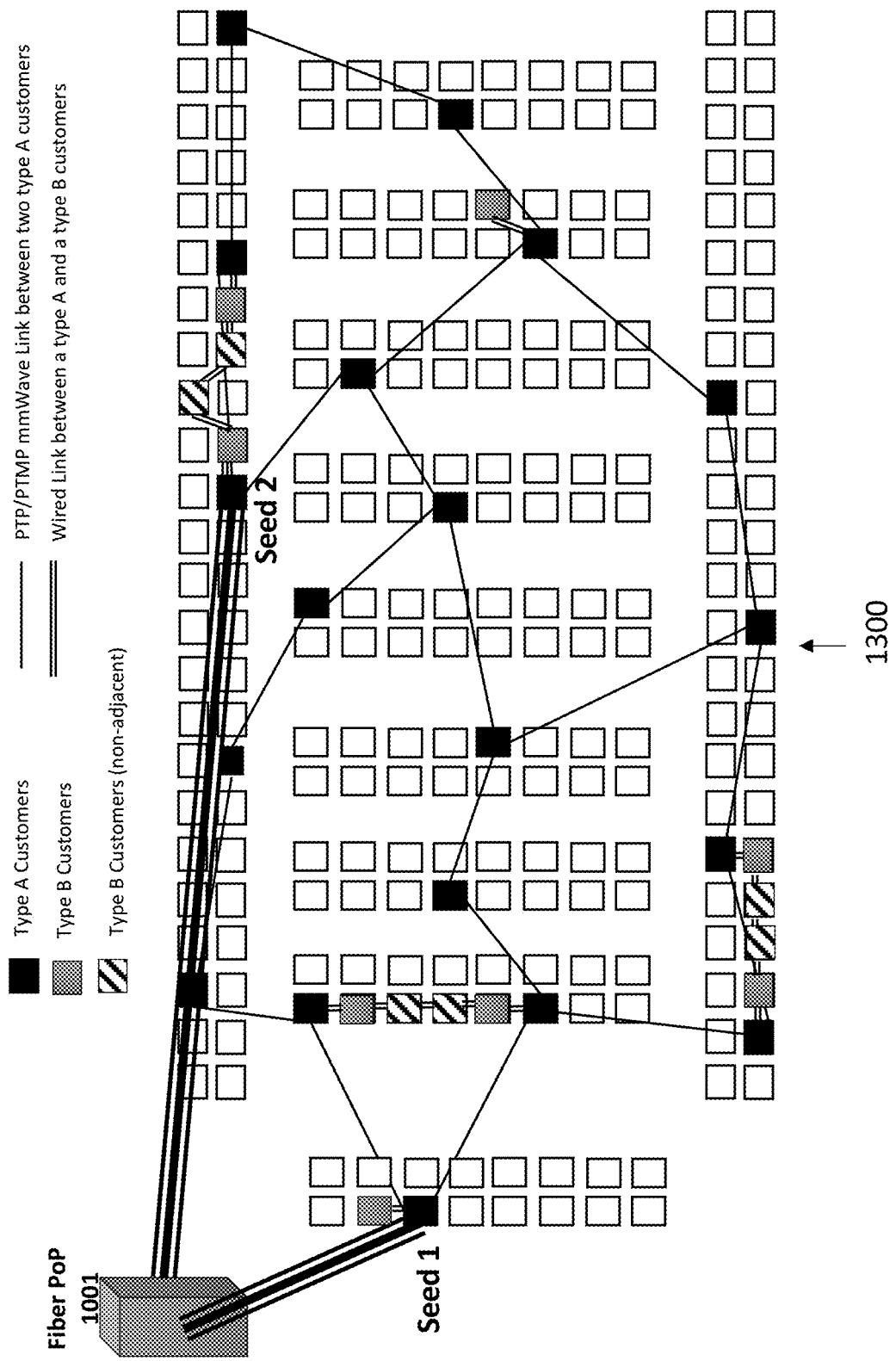
FIG. 13 shows designs illustrating exemplary methods relating to wireless networking and communication systems, in accordance with various aspects of this disclosure.

Referring to FIG. 13, wireless mesh communication network 1300 is shown that is similar to wireless mesh communication network 1000 and 1100 shown in FIGS. 10 and 11, respectively. FIG. 13 additionally shows multiple type B customer nodes that are adjacent to other type B nodes instead of being adjacent to a seed or type A customer node. These non-adjacent (to seed or type A node) type B nodes can be built subsequently after adjacent type B nodes using similar mechanisms for extending a wired link from an adjacent type B node to non-adjacent type B nodes. Similar to adjacent type B nodes described in the context of FIG. 11, the non-adjacent type B nodes provide an alternate power supply option for the mmWave wireless mesh equipment deployed at the seed or type A customer nodes. In addition, similar to adjacent type B customer nodes, non-adjacent type B customer nodes obtain high-speed internet data connection via a wired link from a seed or type A customer node without the need of any mmWave communication equipment, and the customer equipment (e.g., router) at the type B (adjacent and non-adjacent) customer node can be directly connected to the data/power hybrid communication port of the mmWave equipment ports. For example, FIG. 13 highlights six labelled nodes that are labelled from 1 to 6. As explained above, the solid black squares labelled 1 and 6 represent type A nodes, solid grey labelled square nodes labelled 2 and 5 represent adjacent type B nodes, and squares with black stripes labeled 3 and 4 represent non-adjacent nodes.

In one embodiment, non-adjacent nodes that are connected to multiple seed and/or type A customer nodes via a wired link can provide alternate power supply option to multiple seed and/or type A mesh customer nodes. In such cases, these non-adjacent type B customers, such as 3 and 4 of the FIG. 13, can be offered higher uplink and downlink speeds by aggregating data from two wired links for downlink and splitting the data over two or more wired links originating from the non-adjacent type B node in the uplink. In general, this approach for aggregating data for downlink and splitting the data for uplink can be applied to other wireless mesh nodes for throughput enhancement and can be charged at a higher than normal rate.

In other embodiments, non-adjacent type B customer nodes (not shown in FIG. 13) may be connected to only single seed or type A customer node and provide alternate power supply option to only single seed or type A node. As shown in FIG. 13, via a series of adjacent (or near adjacent) type B and non-adjacent type B nodes, two seed or type A nodes can be connected through a wired link. The data path between the seed or type A node and non-adjacent type B node is not dependent on the intermediary adjacent type B node, and at the time of wired link extension for adding a non-adjacent type B node to the mesh network, fiber strand or cable or any other medium used for wired link can be spliced to create a direct connection between a seed or type A node and a non-adjacent type B customer node. This provides protection in the event an adjacent type B node leaves the wireless mesh network for some reason.

Figure 14:
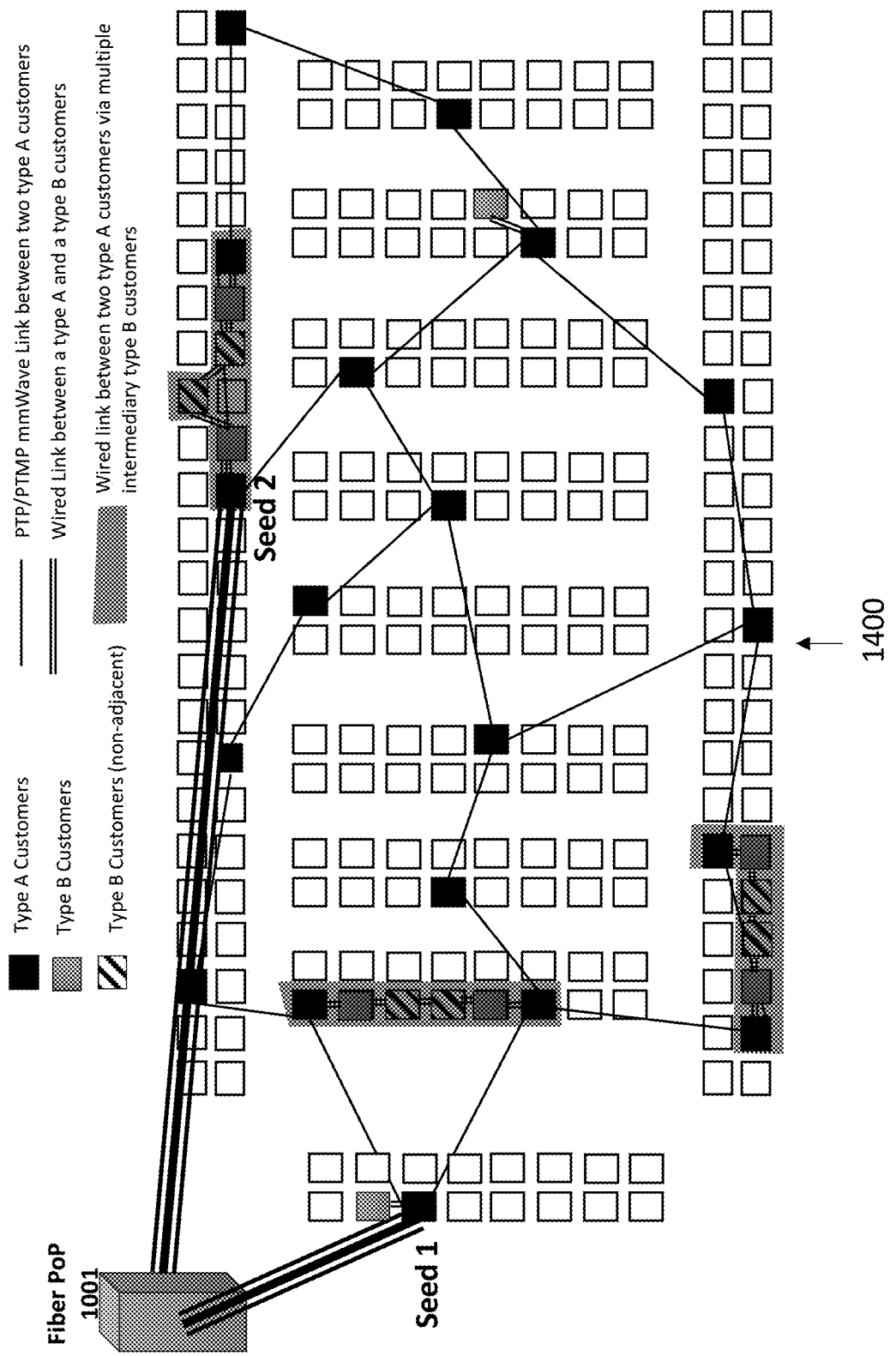
FIG. 14 shows designs illustrating exemplary methods relating to wireless networking and communication systems, in accordance with various aspects of this disclosure.

Referring to FIG. 14, an example wireless mesh communication network 1400 is shown that is similar to other example wireless mesh communication networks discussed above. In particular, FIG. 14 shows that a wired link originating from a seed or type A home can provide connectivity to multiple customer homes and the adjacent and non-adjacent type B homes that benefit from this wired connection can be in a single row or block of homes or can be in different row or block of homes. For example, in one embodiment, a wired link chain that connects the type A node 1 to type A node 6 via adjacent and non-adjacent nodes 2-5 are on a single block or row of homes. In a different embodiment, a wired link chain originating from Seed 2 node has one non-adjacent type B node that is on a different block or row of homes. In a different embodiment, a wired link that connects one seed or type A node to a different seed or type A node of the wireless mesh network via multiple adjacent and/or non-adjacent intermediary type B nodes can have nodes belonging to multiple rows or blocks of homes and the total number of intermediary adjacent and non-adjacent nodes can be any number greater than or equal to one. This ability of two wireless mesh network nodes including seed and type A nodes to be connected via wired links provide opportunities for improved mesh networking due to very high bandwidth of the wired link connected the wireless mesh nodes. This is be used for smart traffic management including load balancing, traffic shaping, data/speed aggregation etc. Moreover, this also provides flexibility in wireless mesh network design that is dependent on having a direct line-of-sight between connected nodes. For example, a prospective customer may not have a line-of-sight from original Seed or Type A customers that have mmWave ptp/ptmp radios installed. However, as long as any intermediary Type B customers or adjacent Type B customer node has a line-of-sight with the prospective customer, connection can be made by either moving (relocating) mmWave radios from Seed or Type A customer node to a adjacent/non-adjacent Type B customer node that has line-of-sight with the prospective customer nodes or by installing additional radios on adjacent/non-adjacent Type B customers without any radio relocation.

In still another aspect of the present disclosure, the disclosed systems and methods may involve a private utility or service provider other than a high-speed internet data service provider who has customers (for example single family home security/automation or solar energy customer) in a certain market or neighborhood and plan to offer high speed internet data services to that market or neighborhood by taking advantage of the respective locations of existing customers and using the existing customers as anchor homes for building wireless mesh network nodes.

Figure 15:
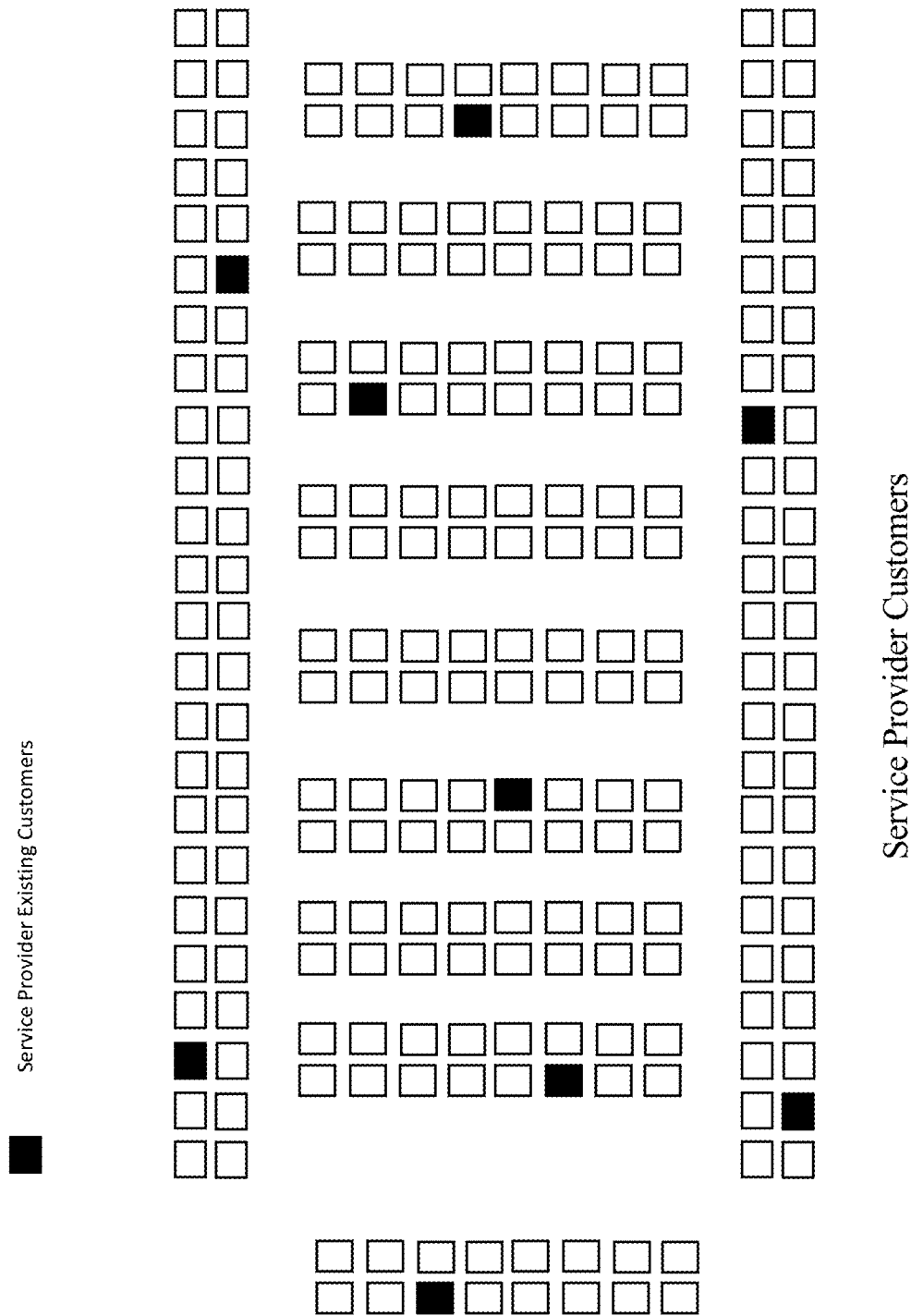
FIG. 15 shows an example diagram relating to wireless networking and communication systems, in accordance with various aspects of this disclosure.

To illustrate, FIG. 15 depicts an example neighborhood where a private utility or service provider offers its services that comprises homes represented by white rectangles arranged in blocks. Homes shown in FIG. 15 may be detached single family homes. In other embodiments, homes can be townhomes that are not detached or MDUs. In some other embodiments, white rectangles can also represent commercial business locations. In some other embodiments, the neighborhood where the private utility or service provider offer its services can have a combination of different types of homes/locations mentioned above.

Black squares in FIG. 15 represent existing customer locations that are current subscribers of the utility or service (s) provided by the private utility or service provider. In one embodiment, the private utility or service provider may plan to build a wireless mesh network using 5G, 4G LTE, and/or millimeter wave frequency based wireless technology and provide high speed internet data services in the market or the neighborhood shown in FIG. 15 where it currently offers its services. In one embodiment, the private utility or service provider may plan to offer high-speed internet as an independent service separate from the utility or service it currently offers to the market or neighborhood. In other embodiments, the private utility or service provider may plan to offer a bundled service (high speed internet data plus the current utility or service) to the market in order to increase the market size of its current utility or service by taking advantage of the large size of high-speed internet data market.

The process of building a wireless mesh network for high speed internet service in one embodiment may start with identifying potential wireless mesh nodes on existing service customer homes that sign up for a high speed wireless internet data service from their existing private utility or service provider, and allowing the existing private utility or service provider to deploy and install wireless mesh network equipment including ptp/ptmp millimeter wave hardware, antennas, cellular technology based small cells, cables and other associated equipment on their property and/or giving roof access rights. These existing customers can be approached through door-to-door marketing/sales and/or through existing communication channels between the private utility or service provider and their customers. Hence, the private utility or service provider may approach its existing customers represented by black rectangles in FIG. 15 and use all or some of the existing customers who sign up for this new high speed interne data service as mesh network nodes.

Next step in building a wireless mesh network node may involve performing a line-of-sight analysis on a subset (including a super subset) of the existing customer locations.

Figure 16:
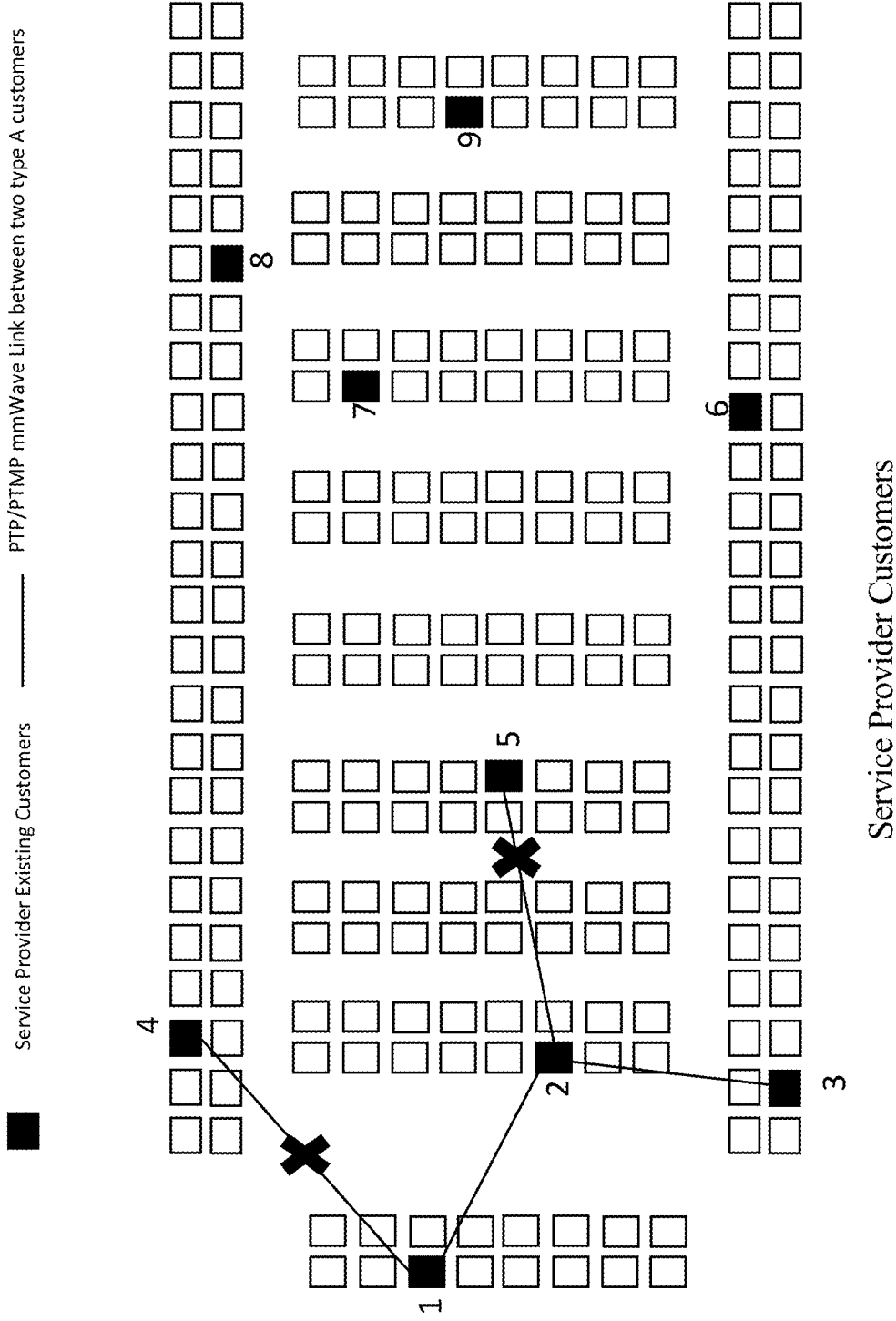
FIG. 16 shows designs illustrating exemplary methods relating to wireless networking and communication systems, in accordance with various aspects of this disclosure.

Referring to FIG. 16, nine (numbered 1 to 9) wireless mesh network nodes represented by black squares are shown, which shows that the private utility or service provider picked those nine existing customer locations to build wireless mesh network nodes. In a different embodiment, a different number of existing customer sites greater than or less than 9 can be selected. Next, as shown in FIG. 16, a line-of-sight analysis between the newly built wireless mesh network nodes on the existing customers of the private utility or service provider may be performed. FIG. 16 shows an example of a line-of-sight profile of wireless mesh nodes from a segment of the neighborhood. FIG. 16 shows that wireless mesh node 1 has a direct line-of-sight path for establishing a ptp/ptmp narrow beam width link to wireless mesh node 2 that can wirelessly connect mesh nodes 1 and 2. Similarly, FIG. 16 shows that wireless mesh node 2 has a direct line-of-sight path for establishing a ptp/ptmp narrow beam width link to wireless mesh node 3 that can wirelessly connect mesh nodes 2 and 3. However, FIG. 16 also shows that wireless mesh node 1 does not have a direct line of sight path for connection to wireless mesh node 4. Likewise, wireless mesh node 2 does not have a direct line-of-sight path with wireless mesh node 5 indicated by cross symbol. Hence, FIG. 16 shows that in case of connectivity between wireless mesh node 1 and 2, and between 2 and 5, single or multiple intermediary nodes may be required.

In one embodiment, none of the existing customer site wireless mesh nodes require an intermediary node to connect them to their nearest or suitable neighbor wireless mesh node as all existing customer wireless mesh nodes exhibit direct line-of-sight with their nearest or suitable neighbors. In another embodiment, all of the existing customer wireless mesh nodes may require an intermediary node to connect them to their nearest or suitable neighbor wireless mesh node as all existing customer wireless mesh nodes may exhibit non-line-of-sight with their nearest or suitable neighbors. In yet another embodiment, wireless mesh network nodes of the private utility or service provider can have some existing customer wireless mesh nodes with direct line-of-sight to their nearest or suitable neighbor along with some existing customer wireless mesh nodes with non-line-of-sight to their nearest neighbor thus requiring intermediary mesh nodes to connect them to their nearest or suitable existing customer. In one embodiment, in case of line-of-sight path/connectivity between existing customer wireless mesh nodes, ptp/ptmp mmWave frequency narrow beam width links may be established between existing customer nodes of the service provider if certain criteria including but not limited to received signal strength, line-of-sight with certain minimum number of neighbor homes, etc. is met.

In case of no line-of-sight connectivity between existing customer nodes of the private utility or service provider, planning for an intermediary node is performed by the wireless mesh network planner or operator. In one embodiment, planning for intermediary node may involve targeted marketing including door-to-door marketing and online/social media/influencer-based marketing to those potential intermediary customer homes that can help in establishing a line-of-sight ptp/ptmp links-based path between existing customer wireless mesh network nodes. Next, some of those intermediary home locations are acquired by sale of high speed internet service to those intermediary customers that sign up for high speed internet service either as an independent service or as a bundled service where in addition to high speed internet service, a utility or service is provided to the customer in exchange for allowing the private utility or service provider to deploy and install wireless mesh network equipment including ptp/ptmp millimeter wave hardware, antennas, cellular technology based small cells, cables and other associated equipment on their property and/or giving roof access rights to the provider. This is followed by building wireless mesh nodes on the newly acquired intermediary customer sites. Next, connectivity between the new intermediary nodes and existing customer nodes is established by adding ptp/ptmp links between these nodes.

Figure 17:
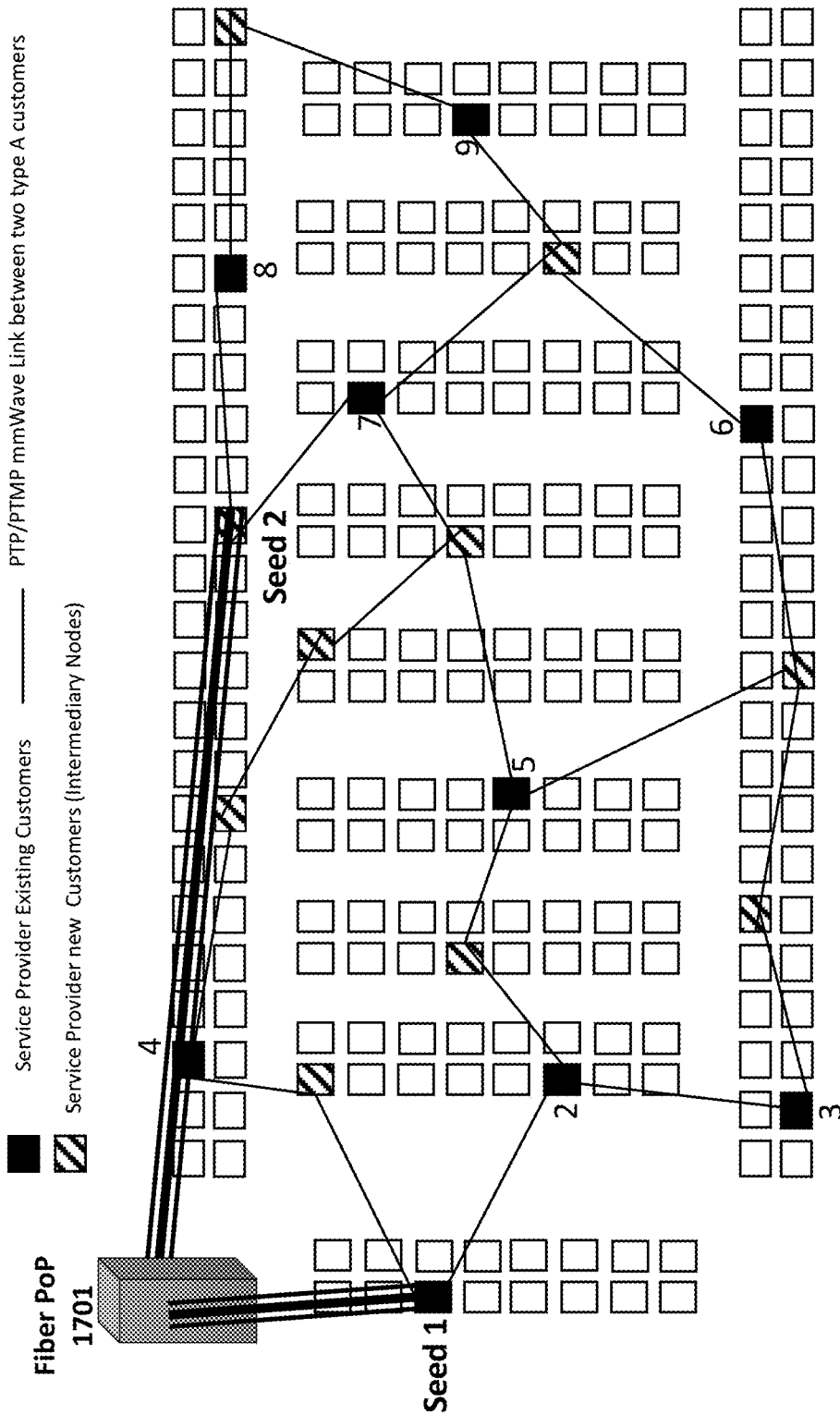
FIG. 17 shows designs illustrating exemplary methods relating to wireless networking and communication systems, in accordance with various aspects of this disclosure.

Referring to FIG. 17, such intermediary nodes are represented by black stripe rectangles and may be sometimes referred to herein as service provider new customer nodes. In one embodiment, a single intermediary ptp/ptmp link is planned to connect two existing customer nodes. One instance of this is shown in FIG. 17 that shows connectivity between wireless mesh nodes Seed 1 node and wireless mesh node 4. In another embodiment, multiple ptp/ptmp links are planned to connect two existing customer nodes. One instance of this is shown for connectivity between existing customer wireless mesh node 4 and existing customer wireless mesh node 7, where 3 intermediary nodes are planned for the mesh network. In other embodiments, more or less than 3 intermediary nodes (service provider new customer nodes) may be required, and the number of intermediary nodes required may depend on the specific mesh network layout or topology.

In turn, a wireless mesh network may be completed by adding high capacity links to seed node sites (e.g., Seed 1 and Seed 2) in order to connect the nodes to a fiber PoP site represented as fiber PoP 1701 in FIG. 17 that provides connectivity to the core network or data center. In one embodiment, seed node sites can be built in an initial phase of wireless mesh network deployment before or together with the existing customer sites. In a different embodiment, seed node sites can be built in the middle of network deployment phase or towards the end of network deployment phase.

Figure 18:
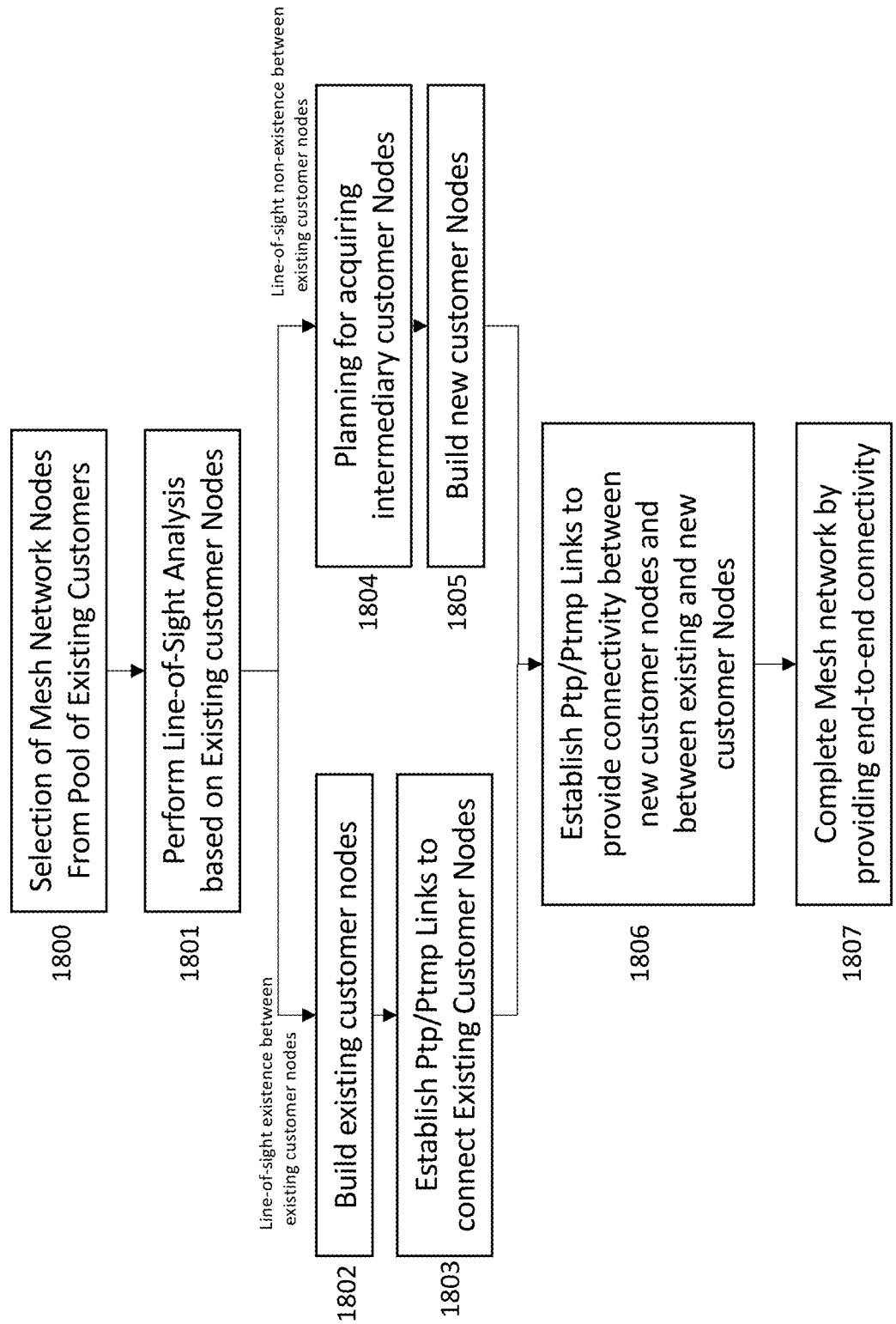
FIG. 18 shows designs illustrating exemplary methods relating to wireless networking and communication systems, in accordance with various aspects of this disclosure.

Referring to FIG. 18 of the current disclosure, an example process flow of a method to build a wireless mesh network for a private utility or service provider is shown in accordance with the present disclosure. The first phase of the method may involve the selection of mesh network nodes from a pool of existing customers at block 1800, where the private utility or service provider approach their existing customers for high speed internet service marketing and select a subset (including a super subset) of those existing service customers who sign up for the high speed internet service from their current private utility or service provider in exchange for the allowing the wireless mesh network operator to deploy and install the wireless mesh network equipment (e.g., antenna, mmWave mash RF/hardware, cellular small cell, cables, power box, etc.) along with roof access rights.

At block 1801, one embodiment may involve performing line-of-sight analysis based on existing customer nodes. In this phase, line of sight analysis is performed to determine which customer nodes have direct line-of-sight path with their nearest or suitable neighbor node and which customer nodes require intermediary nodes to establish connectivity with the nearest or suitable wireless mesh network node.

Based on the above phase, at block 1802, wireless mesh network equipment may be deployed and installed at existing customer nodes and at block 1803, ptp/ptmp links may be established that connect the two existing customer wireless mesh nodes through a high-speed narrow beam width link.

In one embodiment, parallel to block 1802 and 1803, at block 1804, the disclosed process may involve planning for intermediary sites, which may involve targeted door-to-door and online/social media/influencer-based marketing model to get new customers signed up for high speed internet service and allowing the wireless mesh operator to install and deploy wireless mesh network equipment on their premises along with roof access rights. At block 1805, based on the acquired intermediary customer sites, new wireless mesh nodes are built.

In turn, at block 1806, ptp/ptmp links are established between two intermediary new customer nodes and between a new intermediary customer node and an existing customer wireless mesh network node. At block 1807, end to end connectivity may be provided by adding high capacity links via a seed site to a fiber PoP site.

FIG. 18 shows one embodiment of a method for building a wireless mesh network by a private utility or service provider. In other embodiments, some of the blocks shown in FIG. 18 can be omitted and/or replaced with other block. In a different embodiment, the order of the blocks shown in FIG. 18 can be changed. In another embodiment, order of the blocks in FIG. 18 can be changed in conjunction with adding new blocks and/or omitting some blocks.

It is also to be noted that throughout this current disclosure, and specifically in the context of FIG. 17, intermediary nodes are discussed as a means for providing wireless ptp/ptmp connectivity between two existing customer site nodes. However, intermediary nodes can also be built to add more customers to a wireless mesh network and/or to add redundancy to the network. For example, in one embodiment, two existing customer sites may have line-of-sight connectivity but can still be connected via one or more intermediary nodes depending on multiple factors described above (e.g., specific layout).

In still another aspect of the present disclosure, all nodes of the wireless mesh network can be equipped with at least one point-to-multipoint radio that is capable of establishing bi-directional links with multiple neighboring wireless mesh nodes, and possibly other point-to-point or point-to-multipoint nodes. These point-to-multipoint links use time division multiplexing (TDD) to create bi-directional links. For example, assume a ptmp link between node A and node B that is configured for 50% Downlink and 50% Uplink transmission duty cycle. This means that during 50% Downlink time period, node A will be in listening mode and node B will be in transmitting mode. Hence, node B will be uploading, and node A will be downloading. In the next 50% Uplink transmission time period, roles of the nodes A and B will be flipped and during that 50% uplink duty cycle, such that node A will be in the transmitting mode and node B will be in the listening mode.

In the foregoing example, bi-directional links may be symmetric and the data bandwidth in both directions may be the same. However, it should be understood that the transmission duty cycle can be made asymmetric by dedicating more time to downlink or uplink based on the traffic flow requirements.

In a mesh network comprising point-to-multipoint nodes, certain paths along the mesh network may be critical if they carry backhaul data for a large number of customers. Such links can be made more robust by changing the transmission duty cycle of the bi-directional link. For example, assuming that node A is connected to node B, node C, node D and node E and the bi-directional link between node A and node B carries critical backhaul/signaling or other higher priority data of the wireless mesh network and other links including bi-directional links between node A and node C, between node A and node D, between node A and node E just carry regular end user traffic, then the directional link between node A and node B can be made robust by changing the transmission duty cycle of point-to-multipoint radios.

In one embodiment, the transmission duty cycle for the node A can be made such that it performs uplink transmission with node B for 35% of the time, downlink transmission with node B for 35% of the time, uplink transmission with node C, D and E for 5% of the time and downlink transmission with node C, D and E for 5% of the time, Other neighboring nodes of the node A including node B, C, D and E can then adjust their duty cycle to synchronize their transmitting and receiving time intervals accordingly. This will allow to shape the bandwidth of the critical links of the wireless mesh network based on the traffic flow requirement and these changes can be performed dynamically. It should be noted that these duty cycles in some embodiments can be instantaneous duty cycles and in other embodiments, represent average duty cycles over a certain time window with multiple transitions between uplink and downlink.

Example embodiments of the disclosed innovations have been described above. As noted above, it should be understood that the figures are provided for the purpose of illustration and description only and that various components (e.g., modules) illustrated in the figures above can be added, removed, and/or rearranged into different configurations, or utilized as a basis for modifying and/or designing other configurations for carrying out the example operations disclosed herein. In this respect, those skilled in the art will understand that changes and modifications may be made to the embodiments described above without departing from the true scope and spirit of the present invention, which will be defined by the claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

The invention claimed is:

1. A method comprising:
identifying, from a pool of existing customers of a given type of service that is provided by a given service provider, a set of existing customers occupying respective premises that are to serve as a set of existing customer sites for deploying a wireless mesh network that is to deliver a high-speed internet service in addition to the given type of service;
performing a line-of-site (LOS) analysis for the set of existing customer sites;
based on the LOS analysis, identifying (i) a first subset of existing customer sites comprising each existing customer site in the set of existing customer sites that has a sufficient LOS path to at least one other existing customer site so as to enable direct wireless communication with the at least one other existing customer site via a millimeter wave (mmWave) communication link and (ii) a second subset of existing customer sites comprising each existing customer site in the set of existing customer sites that does not have a sufficient LOS path to at least one other existing customer site so as to enable direct wireless communication with the at least one other existing customer site via a mmWave communication link;
identifying, from a pool of prospective customers that were not previously customers of the given type of service provided by the given service provider, a set of new customers occupying respective premises that are to serve as a set of intermediary customer sites for facilitating indirect wireless communication with existing customer sites in the second subset existing customer sites;
deploying equipment for establishing mmWave communication links at the first subset of existing customer sites, the second subset of existing customer sites, and the set of intermediary customer sites;
forming a respective direct wireless communication path between each existing customer site in the first subset of existing customer sites and at least one other existing customer site in the first subset of existing customer sites, wherein each respective direct wireless communication path between two given existing customer sites in the first subset of existing customer sites is formed by establishing a respective mmWave communication link between the two given existing customer sites in the first subset of existing customer sites; and
forming a respective indirect wireless communication path between each existing customer site in the second subset of existing customer sites and at least one other existing customer site via one or more intermediary customer sites, wherein each respective indirect wireless communication path between a given existing customer site in the second subset of existing customer sites and a given other existing customer site is formed by establishing a respective chain of two or more mmWave communication links that extends from the given existing customer site in the second subset of existing customer sites, through one or more intermediary customer sites, to the given other existing customer site.

2. The method of claim 1, wherein the equipment for establishing mmWave communication links that is deployed at the first subset of existing customer sites comprises equipment for establishing one or both of (i) point-to-point mmWave communication links or (ii) point-to-multipoint mmWave communication links.

3. The method of claim 1, wherein, for at least some of the respective indirect wireless communication paths, the respective chain of two or more mmWave communication links that is established comprises (i) a first mmWave communication link established between the given existing customer site in the second subset of existing customer sites and one given intermediary customer site and (ii) a second mmWave communication link established between the given other existing customer site and the one given intermediary customer site.

4. The method of claim 1, wherein, for at least some of the respective indirect wireless communication paths, the respective chain of two or more mmWave communication links that is established comprises (i) a first mmWave communication link established between the given existing customer site in the second subset of existing customer sites and a first one of multiple intermediary customer sites, (ii) a second mmWave communication link established between the given other existing customer site and a second one of the multiple intermediary customer sites, and (iii) one or more additional mmWave communication links established between the multiple intermediary customer sites.

5. The method of claim 1, wherein the equipment for establishing mmWave communication links that is deployed at the second subset of existing customer sites and the set of intermediary customer sites comprises equipment for establishing one or both of (i) point-to-point mmWave communication links or (ii) point-to-multipoint mmWave communication links.

6. The method of claim 1, wherein the given type of service comprises a given type of private utility.

7. The method of claim 1, wherein the identified set of existing customers comprises all existing customers in the pool of existing customers.

8. The method of claim 1, wherein the identified set of existing customers comprises less than all existing customers in the pool of existing customers.

9. The method of claim 1, further comprising:
establishing a mmWave communication link between a given existing customer site in the set of existing customer sites and an access point.

10. The method of claim 9, wherein the mmWave communication link between the given existing customer site and the access point has a higher capacity than any of the respective mmWave communication links between existing customer sites in the first subset of existing customer sites.

11. The method of claim 1, wherein performing the LOS analysis for the set of existing customer sites comprises:
evaluating whether each respective existing customer site in the set of existing customer sites meets given criteria dictating whether the respective existing customer site has a sufficient LOS path to at least one other existing customer site.

12. The method of claim 11, wherein the given criteria comprises one or both of (i) a threshold level of received signal strength from at least one other existing customer site or (ii) a threshold number of other existing customer sites for which the respective existing customer site has a sufficient LOS path.

13. A wireless mesh network comprising:
wireless, millimeter wave (mmWave) communication nodes installed at a first set of sites comprising respective premises of a set of existing customers of a given type of service that is provided by a given service provider, wherein the set of existing customers is selected from a pool of existing customers of the given type of service that is provided by the given service provider, wherein each site in a first subset of the first set of sites is determined to have a sufficient LOS path to at least one other site in the first set of sites that enables direct wireless communication with the at least one other site in the first set of sites via a mmWave communication link, and wherein each site in a second subset of the first set of sites is determined to not have a sufficient LOS path to at least one other site in the first set of sites that enables direct wireless communication with the at least one other site in the first set of sites via a mmWave communication link;
wireless, mmWave communication nodes installed at a second set of sites comprising respective premises of a set of new customers that were not previously customers of the given type of service provided by the given service provider;
a respective direct wireless communication path between each site in the first subset of the first set of sites and at least one other site in the first subset of the first set of sites, wherein each respective direct wireless communication path between two given sites in the first subset of the first set of sites comprises a respective mmWave communication link between the two given sites in the first subset of sites; and
a respective indirect wireless communication path between each site in the second subset of the first set of sites and at least one other site in the first set of sites via one or more intermediary sites in the second set of sites, wherein each respective indirect wireless communication path between a given site in the second subset of the first set of sites and a given other site in the first set of sites comprises a respective chain of two or more mmWave communication links that extends from the given site in the second subset of the first set of sites, through one or more intermediary sites in the second set of sites, to the given other site in the first set of sites.

14. The wireless mesh network of claim 13, wherein the given type of service comprises a given type of private utility.

15. The wireless mesh network of claim 13, wherein the set of existing customers comprises either (i) all existing customers in the pool of existing customers or (ii) less than all existing customers in the pool of existing customers.

16. The wireless mesh network of claim 13, further comprising:
a mmWave communication link between a given site in the first set of sites and an access point.

17. The wireless mesh network of claim 13, wherein equipment for establishing mmWave communication links is deployed at the first subset of the first set of sites that comprises equipment for establishing one or both of (i) point-to-point mmWave communication links or (ii) point-to-multipoint mmWave communication links.

18. The wireless mesh network of claim 13, wherein, for at least some of the respective indirect wireless communication paths, the respective chain of two or more mmWave communication links that is established comprises (i) a first mmWave communication link established between the given site in the second subset of the first set of sites and one given intermediary site in the second set of sites and (ii) a second mmWave communication link established between the given other site in the first set of sites and the one given intermediary site in the second set of sites.

19. The wireless mesh network of claim 13, wherein, for at least some of the respective indirect wireless communication paths, the respective chain of two or more mmWave communication links that is established comprises (i) a first mmWave communication link established between the given site in the second subset of the first set of sites and a first one of multiple intermediary sites in the second set of sites, (ii) a second mmWave communication link established between the given other site in the first set of sites and a second one of the multiple intermediary sites in the second set of sites, and (iii) one or more additional mmWave communication links established between the multiple intermediary sites in the second set of sites.

20. The wireless mesh network of claim 13, wherein equipment for establishing mmWave communication links that is deployed at the second subset of the first set of sites and the second set of sites comprises equipment for establishing one or both of (i) point-to-point mmWave communication links or (ii) point-to-multipoint mmWave communication links.

* * * * *